US011017212B2

(12) United States Patent
Trani et al.

(10) Patent No.: US 11,017,212 B2
(45) Date of Patent: May 25, 2021

(54) METHODS AND APPARATUS FOR BIOMETRIC VERIFICATION

(71) Applicant: Stone Lock Global, Inc., Olathe, KS (US)

(72) Inventors: James Trani, Albuquerque, NM (US); David Douglas Dunlap, Leawood, KS (US)

(73) Assignee: Stone Lock Global, Inc., Overland Park, KS (US)

( * ) Notice: Subject to any disclaimer, the term of this patent is extended or adjusted under 35 U.S.C. 154(b) by 76 days.

(21) Appl. No.: 16/297,366

(22) Filed: Mar. 8, 2019

(65) Prior Publication Data
US 2020/0193145 A1    Jun. 18, 2020

Related U.S. Application Data

(63) Continuation-in-part of application No. 16/104,826, filed on Aug. 17, 2018, now abandoned, which is a
(Continued)

(51) Int. Cl.
*G06K 9/00*  (2006.01)
(52) U.S. Cl.
CPC .................. *G06K 9/00288* (2013.01)
(58) Field of Classification Search
CPC . H04L 67/306; H04L 63/0861; H04L 9/3231; H04L 63/105; H04L 63/20;
(Continued)

(56) References Cited

U.S. PATENT DOCUMENTS 6,219,794 B1    4/2001    Soutar et al.
6,309,069 B1    10/2001   Seal et al.
(Continued)

FOREIGN PATENT DOCUMENTS

WO    2020036710 A1    2/2020

OTHER PUBLICATIONS

Huang et al., Local Binary Patterns and Its Application to Facial Image Analysis: A Survey, 2011, IEEE Transactions on Systems, Man, and Cybernetics—Part C: Applications and Reviews, vol. 41, No. 6, Nov. 2011, pp. 765-781.*
(Continued)

*Primary Examiner* — Guillermo M Rivera-Martinez
(74) *Attorney, Agent, or Firm* — Arent Fox LLP

(57) ABSTRACT

Aspects of the present disclosure include methods for generating a sampled profile including a plurality of sampling points having a plurality of characteristic values associated with the detected non-visible light, identifying one or more macroblocks each includes a subset of the plurality of sampling points, calculating a number of occurrences of the local pattern value within each subset of the plurality of the sampling points for each of the one or more macroblocks, generating a first array including a plurality of weighted values by calculating the plurality of weighted values based on the numbers of occurrences of the local pattern value and corresponding sizes of the one or more macroblocks, assigning a unique index to each of the plurality of weighted values, generating a second array of the unique index by ranking the plurality of weighted values, and generating a third array including a plurality of ranking distances.

20 Claims, 26 Drawing Sheets

Related U.S. Application Data continuation-in-part of application No. 15/649,144, filed on Jul. 13, 2017, now Pat. No. 10,438,053, which is a continuation of application No. 14/022,080, filed on Sep. 9, 2013, now Pat. No. 9,740,917.

(60) Provisional application No. 61/792,922, filed on Mar. 15, 2013, provisional application No. 61/698,347, filed on Sep. 7, 2012.

(58) Field of Classification Search
CPC . H04L 9/0822; H04L 9/3257; G06K 9/00617; G06K 9/00087; G06K 9/00114; G06K 9/00892; G06K 9/4661; G06Q 20/40145; G06F 21/32; G06F 2221/2142; G06F 3/038

See application file for complete search history.

(56) References Cited

U.S. PATENT DOCUMENTS

| | | | |
|---|---|---|---|
| 6,496,595 B1* | 12/2002 | Puchek | G07C 9/257 382/124 |
| 6,940,976 B1* | 9/2005 | Matyas, Jr. | H04L 9/0866 380/280 |
| 8,515,139 B1* | 8/2013 | Nechyba | G06K 9/6256 382/118 |
| 2002/0140542 A1* | 10/2002 | Prokoski | G06K 9/00973 340/5.52 |
| 2004/0036574 A1* | 2/2004 | Bostrom | G07C 9/38 340/5.82 |
| 2004/0250085 A1* | 12/2004 | Tattan | H04L 63/0861 713/186 |
| 2006/0102843 A1* | 5/2006 | Bazakos | G06K 9/00255 250/339.05 |
| 2006/0239511 A1* | 10/2006 | White | H04L 9/3231 382/115 |
| 2007/0198850 A1* | 8/2007 | Martin | G07C 9/257 713/186 |
| 2008/0270803 A1* | 10/2008 | Zizzi | H04L 9/0897 713/186 |
| 2009/0002708 A1 | 1/2009 | McFarland et al. | |
| 2009/0254572 A1* | 10/2009 | Redlich | G06Q 10/06 |
| 2009/0292641 A1* | 11/2009 | Weiss | G06Q 20/385 705/66 |
| 2010/0138668 A1* | 6/2010 | Tsuria | H04H 60/23 713/186 |
| 2010/0186074 A1 | 7/2010 | Stavrou et al. | |
| 2010/0250497 A1* | 9/2010 | Redlich | H04L 63/0227 707/661 |
| 2010/0290668 A1* | 11/2010 | Friedman | G06K 9/00255 382/103 |
| 2011/0026781 A1* | 2/2011 | Osadchy | G06K 9/00221 382/118 |
| 2011/0188710 A1* | 8/2011 | Muquit | G06K 9/00 382/115 |
| 2012/0106790 A1* | 5/2012 | Sultana | G06K 9/00241 382/103 |
| 2012/0213422 A1 | 8/2012 | Niskanen et al. | |
| 2012/0278614 A1* | 11/2012 | Choi | H04W 12/0608 713/159 |
| 2012/0293642 A1 | 11/2012 | Berini et al. | |
| 2013/0015946 A1 | 1/2013 | Lau et al. | |
| 2013/0227651 A1 | 8/2013 | Schultz et al. | |
| 2014/0067679 A1* | 3/2014 | O'Reilly | G06Q 20/40145 705/44 |
| 2014/0072185 A1 | 3/2014 | Dunlap et al. | |
| 2015/0007295 A1* | 1/2015 | Hou | G06K 9/00979 726/7 |
| 2015/0011194 A1 | 1/2015 | Rodriguez | |
| 2016/0063235 A1* | 3/2016 | Tussy | G06Q 20/40145 726/6 |
| 2016/0269411 A1* | 9/2016 | Malachi | H04L 63/10 |
| 2016/0294555 A1 | 10/2016 | Jakobsson et al. | |
| 2016/0308850 A1 | 10/2016 | Barry et al. | |
| 2016/0308859 A1* | 10/2016 | Barry | G06K 9/2036 |
| 2017/0140141 A1 | 5/2017 | Yan et al. | |
| 2017/0262472 A1* | 9/2017 | Goldenberg | G06K 9/00295 |
| 2017/0308740 A1 | 10/2017 | Dunlap et al. | |
| 2018/0077138 A1* | 3/2018 | Bansal | H04L 63/0815 |
| 2018/0165823 A1 | 6/2018 | Ludwig | |
| 2018/0181737 A1 | 6/2018 | Tussy | |
| 2018/0191952 A1 | 7/2018 | Ardo et al. | |
| 2018/0330179 A1* | 11/2018 | Streit | G06F 7/483 |
| 2019/0057268 A1 | 2/2019 | Burge et al. | |
| 2019/0347916 A1* | 11/2019 | Wild | H04L 67/025 |

OTHER PUBLICATIONS

Gyaourova et al., Index Codes for Multibiometric Pattern Retrieval, 2012, IEEE Transactions on Information Forensics and Security, vol. 7, No. 2, Apr. 2012, pp. 518-529.*

Fu et al., Centralized Binary Patterns Embedded with Image Euclidean Distance for Facial Expression Recognition, 2008, 2008 Fourth International Conference on Natural Computation 2008, Jinan, 2008, pp. 115-119.*

International Search Report and Written Opinion issued in International Application No. PCT/US20/21256 dated May 15, 2020.

Gyaourova et al., Index Codes for Multibiometric Pattern Retrieval, 2012, IEEE Transactions on Information Forensics and Security, vol. 7, No. 2, Apr. 2010, pp. 518-529.

Huang et al., "Local Binary Patterns and Its Application to Facial Image Analysis: A Survey", 2011, IEEE Transactions on Systems, Man, and Cybernetics—Part C: Applications and Reviews, vol. 41, No. 6, pp. 765-781.

International Search Report issued in International Application No. PCT/US2019/043008 dated Oct. 2, 2019.

Guruprasad et al., "Face Recognition using Transform Domain Techniques", IOSR Journal of VLSI and Signal Processing (IOSR-JVSP), Volume, Issue 3, Ver. II (May-Jun. 2015).

International Search Report and Written Opinion issued in International Application No. PCT/US2020/031483 dated Jul. 24, 2020.

* cited by examiner

| Unique Index | Macroblock Size | Macroblock Position (top,left) | ULBP Value | Weighted Value | Sequence | Stored Array |
|---|---|---|---|---|---|---|
| 1 | 10 | 5,5 | 1 | .30 | 5 | 5 |
| 2 | 35 | 30,35 | 10 | .54 | 2 | 1 |
| 3 | 20 | 70,80 | 34 | .15 | 7 | 6 |
| 4 | 30 | 5,90 | 28 | .42 | 6 | 4 |
| 5 | 15 | 90,5 | 57 | .62 | 4 | 0 |
| 6 | 40 | 30,30 | 9 | .46 | 1 | 3 |
| 7 | 15 | 0,0 | 41 | .53 | 3 | 2 |

METHODS AND APPARATUS FOR BIOMETRIC VERIFICATION

CROSS-REFERENCE TO RELATED APPLICATIONS

This application is a Continuation-in-Part of U.S. patent application Ser. No. 16/104,826, filed on Aug. 17, 2018, which is a Continuation-in-Part of U.S. patent application Ser. No. 15/649,144, filed on Jul. 13, 2017, which is a Continuation of U.S. patent application Ser. No. 14/022,080, filed on Sep. 9, 2013, now U.S. Pat. No. 9,740,917, issued Aug. 22, 2017, which claims the benefit of U.S. Provisional Application No. 61/792,922, filed on Mar. 15, 2013, and U.S. Provisional Application No. 61/698,347, filed on Sep. 7, 2012, the contents of which are incorporated by reference it their entireties.

BACKGROUND

There has been a growing need for stronger identity verification to protect personal property, both physical and electronic. For example, it is important to control access to premises, vehicles, and personal property so that only authorized requesters are allowed access. A requester may be a user/person that requests access to an access controlled assets and/or infrastructure. In a traditional example, a requester may carry and use a key, which is designed to fit a lock to allow the requester of the key to open the lock and gain entry. A loss or damage to the key, however, can render access impossible. In another example, a requester may use a key fob to remotely lock or unlock the doors of a vehicle by, e.g., pressing a button on the fob to generate an infrared ("IR") or radio frequency ("RF") signal, which is detected by a sensor in the vehicle, which controls the doors. Such vehicle keyless access systems may require the requester to operate the ignition system. Other similar keyless access implementations may involve inserting and presenting a magnetic card or the like in a slot or a card reader/detector, or enabling an authorized requester to key in a numeric or alphanumeric code on a provided keypad. In each of these conventional techniques, however, it is very difficult to determine if the person holding the key/card is the actual authorized requester. An imposter may steal or duplicate a valid key and gain unauthorized accesses to the premise, vehicle, and/or personal property.

While traditional biometrics access control systems may mitigate some shortcomings of keys/cards-based access control systems, there may be limitations as well. Traditional biometric sensors, such as iris detection sensors, may be limited to specific light conditions significantly reducing both the effectiveness of the biometric sensor as well as the possible environments to apply same. The performance of biometric sensors may be compromised in direct sunlight due to glares, shadows, and other artifacts. Even with the emergence of mega-pixel camera technology, the features of each face may be obscured by ambient lighting, the position of the face, changes to the face, the background behind the face and the quality of the camera. Motion blur, insufficient resolution, environmental impacts, lighting, background, and camera angles collude to obscure subject details, making heterogeneous facial recognition (the matching of video and other probe images to large databases of frontal photographs) difficult.

Other factors may also increase the false acceptance and/or false recognition rates of traditional biometric sensors. For example, biometric sensors also have difficulties obtaining the necessary data in the absence of light. Light source shadowing and other changes in intensity may create contrasts on the face that may be misinterpreted as facial features, and/or slightly distort the measurement of the real facial features. Another major source of inaccuracy is the increased probability of similar measured features between faces in a growing population. Further, the problem of capturing the features of each face may be compounded by the desire for low maintenance and/or low complexity facial recognition systems. Therefore, improvement in access control may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some aspects of the present disclosure include methods for generating a sampled profile including a plurality of sampling points having a plurality of characteristic values associated with the detected non-visible light, identifying one or more macroblocks each includes a subset of the plurality of sampling points, selecting a local pattern value, calculating a number of occurrences of the local pattern value within each subset of the plurality of the sampling points for each of the one or more macroblocks, generating a first array including a plurality of weighted values by calculating the plurality of weighted values based on the numbers of occurrences of the local pattern value and corresponding sizes of the one or more macroblocks, assigning a unique index to each of the plurality of weighted values, generating a second array of the unique index by ranking the plurality of weighted values, and generating a third array including a plurality of ranking distances.

Certain aspects of the present disclosure include an edge capture device (ECD) ECD having an illumination source configured to emit an incident non-visible light, an optical sensor configured to detect a detected non-visible light, wherein the detected non-visible light includes a reflected non-visible light and a radiated non-visible light, one or more processors operatively coupled to the illumination source and the optical sensor, the one or more processors are configured to construct a biometric template of a requester requesting access to an entry point by generating a sampled profile including a plurality of sampling points having a plurality of characteristic values associated with the detected non-visible light, identifying one or more macroblocks each includes a subset of the plurality of sampling points, selecting a local pattern value, calculating a number of occurrences of the local pattern value within each subset of the plurality of the sampling points for each of the one or more macroblocks, generating a first array including a plurality of weighted values by calculating the plurality of weighted values based on the numbers of occurrences of the local pattern value and corresponding sizes of the one or more macroblocks, assigning a unique index to each of the plurality of weighted values, generating a second array of the unique index by ranking the plurality of weighted values, and generating a third array including a plurality of ranking distances.

Aspects of the present disclosure include a computer readable medium having code stored therein that, when executed by one or more processors, cause the one or more processors to execute code for generating a sampled profile including a plurality of sampling points having a plurality of characteristic values associated with the detected non-visible light, code for identifying one or more macroblocks each includes a subset of the plurality of sampling points, code for selecting a local pattern value, code for calculating a number of occurrences of the local pattern value within each subset of the plurality of the sampling points for each of the one or more macroblocks, code for generating a first array including a plurality of weighted values by calculating the plurality of weighted values based on the numbers of occurrences of the local pattern value and corresponding sizes of the one or more macroblocks, code for assigning a unique index to each of the plurality of weighted values, generating a second array of the unique index by ranking the plurality of weighted values, and code for generating a third array including a plurality of ranking distances.

An aspect of the present disclosure includes a system having means for generating a sampled profile including a plurality of sampling points having a plurality of characteristic values associated with the detected non-visible light, means for identifying one or more macroblocks each includes a subset of the plurality of sampling points, means for selecting a local pattern value, means for calculating a number of occurrences of the local pattern value within each subset of the plurality of the sampling points for each of the one or more macroblocks, means for generating a first array including a plurality of weighted values by calculating the plurality of weighted values based on the numbers of occurrences of the local pattern value and corresponding sizes of the one or more macroblocks, means for assigning a unique index to each of the plurality of weighted values, generating a second array of the unique index by ranking the plurality of weighted values, and means for generating a third array including a plurality of ranking distances.

Aspects of the present disclosure include an infrastructure having an access-controlled entry point, a ECD configured to emit an incident non-visible light onto a face of a requester, detect a detected non-visible light from the face of the requester, wherein the detected non-visible light includes a reflected non-visible light and a radiated non-visible light, generate a biometric template of the requester by generating a sampled profile including a plurality of sampling points having a plurality of characteristic values associated with the detected non-visible light, identifying one or more macroblocks each includes a subset of the plurality of sampling points, selecting a local pattern value, calculating a number of occurrences of the local pattern value within each subset of the plurality of the sampling points for each of the one or more macroblocks, generating a first array including a plurality of weighted values by calculating the plurality of weighted values based on the numbers of occurrences of the local pattern value and corresponding sizes of the one or more macroblocks, assigning a unique index to each of the plurality of weighted values, generating a second array of the unique index by ranking the plurality of weighted values, and generating a third array including a plurality of ranking distances, store a plurality of biometric templates of authorized personnel, compare the biometric template of the requester with the plurality of biometric templates of authorized personnel, generate a positive match signal in response to identifying a match between the biometric template of the requester and one of the plurality of biometric templates of authorized personnel, and transmit the positive match signal to a gateway to grant the requester access to the entry point.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

FIG. 7($b$) shows a different facial image for the same person, in accordance with some aspects of the present disclosure;

FIG. 23 illustrates an example of a table of results for sequence conversion, in accordance with aspects of the present disclosure;

DETAILED DESCRIPTION

Figure 1:
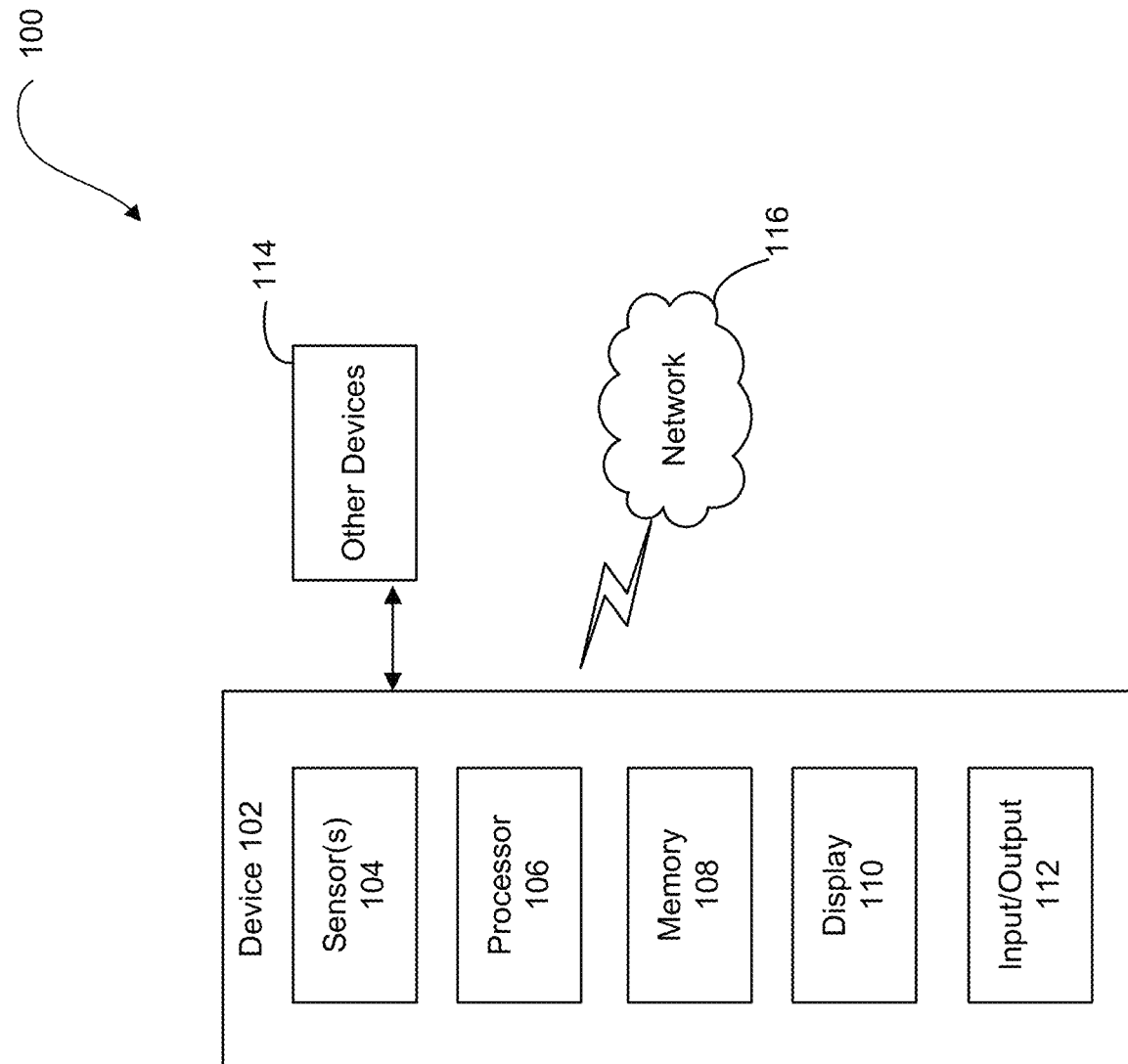
FIG. 1 is an example concurrent real-time identity verification and authentication system, in accordance with some aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is communicatively coupled to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

As used in the specification and the appended claims, the singular forms "a," "an" and "the" include plural referents unless the context clearly dictates otherwise.

Ranges may be expressed herein as from "about," "substantially," or "approximately" one particular value and/or to "about," "substantially," or "approximately" another particular value. When such a range is expressed, another implementation includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Biometric identification techniques generally refer to pattern recognition techniques that perform a requester identification process by determining the authenticity of a specific physiological or behavioral characteristic possessed by the requester. In some instances, biometric identification may be preferred over traditional methods involving passwords and personal identification numbers (PINs) for various reasons. For example, with biometric identification, the person (e.g., requester) to be identified is typically required to be physically present at the point-of-identification. Additionally, identification based on biometric techniques obviates the need to remember a password or carry a token (i.e., a security device used to gain access to an access controlled entry point).

One kind of texture based local binary pattern ("LBP") feature describes facial information that produces desirable recognition results. The improved local ternary pattern ("LTP") feature may be a further improvement over conventional LBP methods. LBP and LTP features may not be sensitive to light and expression variations and are computationally efficient, but they also have shortcomings, such as information redundancy due to correlation between the positive histogram and the negative histogram.

It is therefore desirable to contemplate concurrent real-time identity verification and authentication techniques to create biometric signature data for providing keyless access to authorized requesters to a vehicle, building, or the like with varying degrees of security by utilizing various types of biometric data of authorized requesters. As discussed above, in some implementations of the present disclosure, the biometric signature data may be interchangeable across a wide variety of applications. Accordingly, in some examples of the present disclosure, the same biometric signature data for a person may be used to authenticate that person at one or more locations and for one or more applications. Additionally, an example of a biometric system in the present disclosure allows the biometric signature data to be altered based on a desired security level. Thus, the type of biometric signature data that may be used for a particular application and/or relating to a particular requester may vary depending on the security level desired for that particular application and/or requester. While some implementations discussed herein are discussed in the context of facial biometric data, those skilled in the art would understand that various implementations of the present disclosure may employ many types of biometric data, including, but not limited to, fingerprint data, iris and retinal scan data, speech data, facial thermograms, hand geometry data, and the like.

In some implementations of the present disclosure, the biometric data associated with the intended recipient (e.g., a biometric template) may be obtained via a biometric sensor of a biometric-based access control system. As will be discussed below, variations in light, temperature, distance of the biometric sensor from a target may impact the quantity and quality of the biometric data obtained via the biometric sensor. For example, variations in light intensity and angle may create shadows on the face of a requester, making facial recognition more difficult. If the biometric data for identifying a requester is obscured, more templates may be needed to properly authenticate the requester, thus increasing the quantity of the biometric data necessary. To reduce the undesirable impact of these environmental factors, the biometric sensor may utilize either near infrared (IR) or ultraviolet (UV) light or a combination of both IR and UV at desired intensities. In an implementation, the method uses near IR light. An Infrared light emitting diode (LED) array may be utilized in the facial recognition device or biometric sensor to minimize the impact of the surrounding lighting on capturing the facial uniqueness. The camera and the LED array are packaged into a dedicated edge device (e.g., an ECD or a faceplate) mounted at a location requiring verification and/or identification/analysis, such as a door requiring access control.

In some implementations, an access control system may utilize IR or new IR illumination and detection to identify facial features. IR or new IR lighting may penetrate into the dermis of the face. The IR or new IR lighting may penetrate into the dermis by 10 micrometers, 20 micrometers, 50 micrometers, 100 micrometers, 200 micrometers, 500 micrometers, 1 millimeters, 2 millimeters, 5 millimeters, and/or 10 millimeters. Other penetration depths are possible. The penetration depths may depend on the location of the body, wavelength of the infrared lighting, and/or intensity of the infrared lighting. The penetration may expose characteristics of the skin that may be difficult to see in visible light including (age spots, spider veins, hyperpigmentation, rosacea, acne, and porphyrins). The identification of these subdermal features may be used to adjust/supplement the unique identification of the requester. These features on the face of the requester may be unique because they are based on the requesters exposure to nature and the sun over the life of the requester. Facial recognition based on subdermal features may identify the uniqueness of the face at the time of capture to provide opportunities for identification analysis. The number of subdermal features may increase over time with exposure to the sun and on a daily basis.

In another example, an access control system may utilize ultraviolet illumination and detection to identify facial features. Ultraviolet lighting may penetrate into the dermis of the face. The UV lighting may penetrate into the dermis by 10 micrometers, 20 micrometers, 50 micrometers, 100 micrometers, 200 micrometers, 500 micrometers, 1 millimeters, 2 millimeters, 5 millimeters, and/or 10 millimeters. Other penetration depths are possible. The penetration depths may depend on the location of the body, wavelength of the ultraviolet lighting, and/or intensity of the ultraviolet lighting. The penetration may expose characteristics of the skin that may be difficult to see in visible light including (age spots, spider veins, hyperpigmentation, rosacea, acne, and porphyrins). The identification of these subdermal features may be used to adjust/supplement the unique identification of the requester. These features on the face of the requester may be unique because they are based on the requesters exposure to nature and the sun over the life of the requester. Facial recognition based on subdermal features may identify the uniqueness of the face at the time of capture to provide opportunities for identification analysis. The number of subdermal features may increase over time with exposure to the sun and on a daily basis. The facial recognition system of the present disclosure may estimate the age of a person based on the quantity and nature of the subdermal features. The access control system may also track the change in these features over time to confirm the individual's identity and establish lifestyle and daily routines based on interpretations of the subdermal features. Subdermal facial recognition may also increase the difficulty of creating a duplicate (e.g., duplicate of a biometric template) of the face due to its elimination of dependency on facial features capable of being captured by standard visible wavelength photography and camera technology. The access control system may also further obfuscate the content of the ultraviolet capture by introducing time-sequenced cross-polarization filters to the capturing process that further eliminates the ability to present an artificial duplicate of the face to the access control system.

A benefit of the system in the present disclosure includes allowing a single credential system replacing PINs, passwords, and multi-factor authentication that is seamless to the requester. With this architecture in place, the requester(s) of the system may rely on a single credential management solution. The system of the present disclosure may support both logical and physical gateways. In some implementations of the present disclosure, the system may provide protection at home and at work.

Aspects of the present disclosure may include a method referred to as "layered reinforcement." The method comprises of taking the image of face from the biometric sensor and overlaying several layers of different size pixel boxes on the image. This layering of pixel boxes of different sizes has an amplifying impact on the analysis of the uniqueness of the face. Areas that are more unique to the face are amplified. Areas that are more common among faces are deemphasized. As a result, layered reinforcement may improve the algorithm performance while allowing the method to handle a large number of users at multiple sites where the biometric sensor ECD is deployed. The "layer reinforcement" of the method may allow for the processing of the same number of requesters on a local Advanced Reduced Instruction Set Computing Machine (ARM) processor at the biometric sensor ECD where the image is first captured, thus reducing hardware and processing requirements and contributing to the accuracy and reliability of the method as a network failure cannot prevent the biometric sensor ECD from processing a face verification.

Some aspects of this embodiment of the invention cover the use of a gateway (described below) to manage the data analyzed by the various algorithms to increase performance by decreasing false negative and false positive results through the following processes: pixel box hierarchical analysis to create binary tree of dominant features (i.e., determining what is the most distinctive feature); pixel box time domain analysis with heat maps (i.e., determining over time features that are problematic due to overlap among subjects); and binary tree collision (flagging overlap of biometric signature data for two subjects that may cause a false positive and addressing in a proactive fashion).

Benefits to the system of the present disclosure include improved performance when accuracy requires reduction in false negative and false positive results. The improvement also allows for the benefits of 1:1 comparison in a 1:N environment as a potential replacement to video surveillance and comparison thereby opening up the massive surveillance market to significantly increased accuracy.

Referring to FIG. 1, an example of an identification system 100 for concurrent real-time identity verification and authentication for use in, e.g., allowing access by an authorized requester to a vehicle, building, or the like is illustrated in accordance with aspects of the present disclosure.

It should be appreciated that FIG. 1 is intended to describe aspects of the disclosure to enable those skilled in the art. Other implementations may be utilized and changes may be made without departing from the scope of the present disclosure.

The identification system 100 comprises a concurrent real-time identity verification and authentication device 102 including at least one biometric sensor 104, a processor 106, memory 108, a display 110, and input/output mechanism 112. The identification system 100 may be used to secure or control access to a secured area, device, or information, such as an airport boarding area, building, stadium, database, locked door, vehicle, or other access controlled assets/infrastructure.

Figure 2:
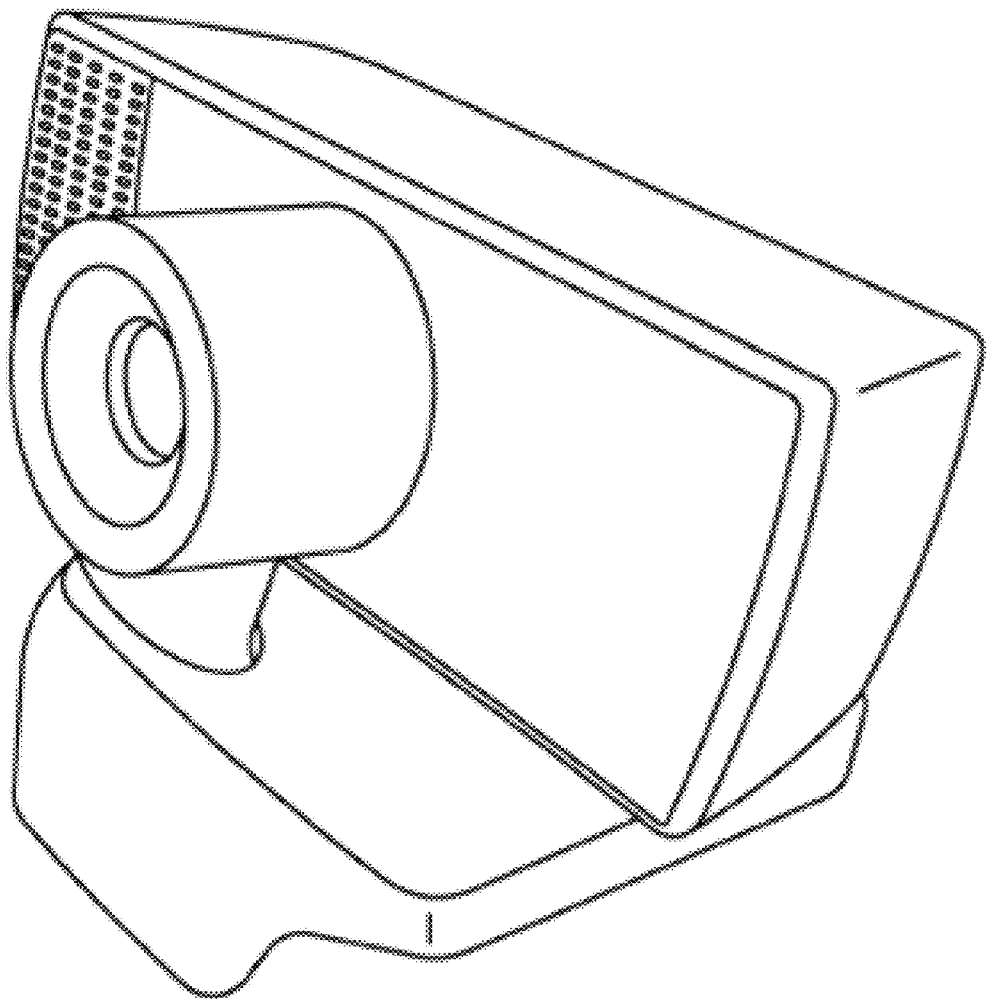
FIG. 2 shows a perspective view of an example of a concurrent real-time identity verification and authentication device, in accordance with some aspects of the present disclosure.
Figure 3:
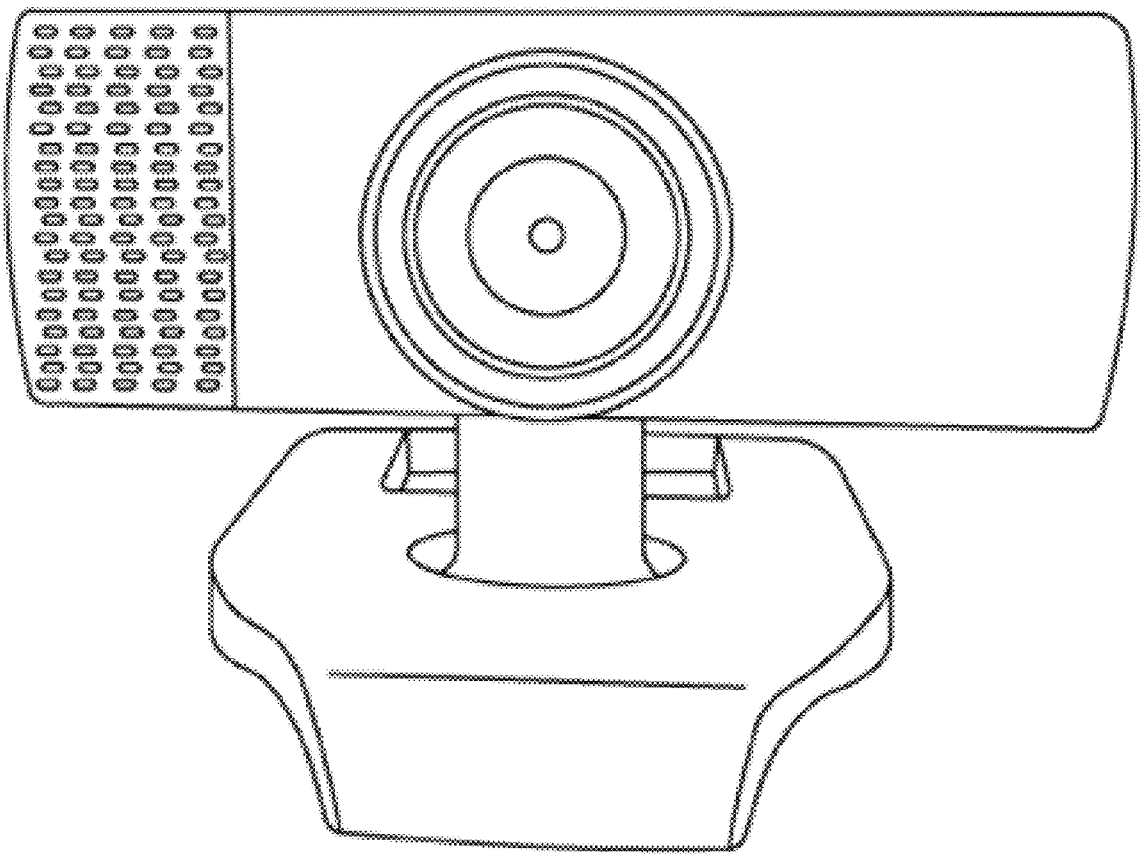
FIG. 3 shows a frontal view of an example of a concurrent real-time identity verification and authentication device, in accordance with some aspects of the present disclosure.
Figure 4:
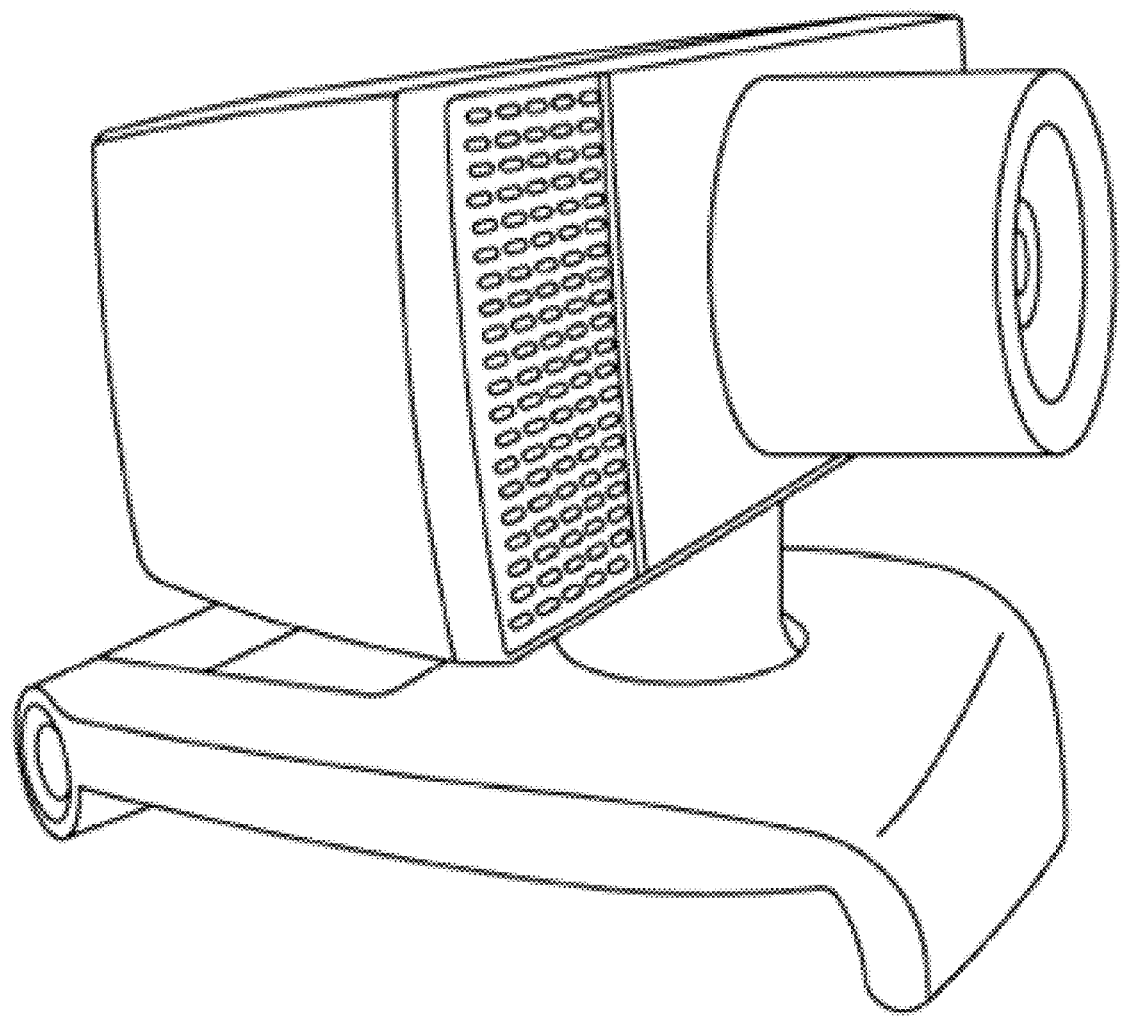
FIG. 4 shows another perspective view of an example of a concurrent real-time identity verification and authentication device, in accordance with some aspects of the present disclosure.

The biometric sensor(s) 104 may include a camera, a fingerprint reader, retinal scanner, facial recognition scanner, weight sensor, height sensor, body temperature sensor, gait sensor, heartbeat sensor, or any other sensor or device capable of sensing a biometric characteristic of a person. As shown in FIGS. 2-4, in an exemplary implementation of the present disclosure, the biometric sensor(s) 104 may be an optical sensor, such as a camera.

In some aspects, the biometric sensor(s) 104 may include an optical sensor that captures visual data. For example, the biometric sensor(s) 104 may be a camera that senses visual information of a requester, such as the facial features of the person. The facial features of the person may include the textures, complexions, bone structures, moles, birthmarks, contours, coloring, of the face of the person. The biometric sensor(s) 104 may capture the facial features of the person and convert the visual information into digital sensed information as discussed below).

The processor 106 may be configured for comparing the sensed information via biometric sensor(s) 104 with known characteristics of a person in an attempt to identify the person via biometric signature data. The processor 106 may include any number of processors, controllers, integrated circuits, programmable logic devices, or other computing devices. The processor 106 may be communicatively coupled with the biometric sensor(s) 104 and other components of the system 100 through wired or wireless connections to enable information to be exchanged between the device 102 and external devices 114 or systems (e.g., network 116) to allow for comparison of the stored biometric signature data with the sensed information obtained from the biometric sensor(s) 104.

The processor 106 may implement a computer program and/or code segments stored on memory 108 to perform some of the functions described herein. The computer program may include an ordered listing of executable instructions for implementing logical functions in the device 102. The computer program can be embodied in any computer-readable medium (e.g., memory 108) for use by or in connection with an instruction execution system, apparatus, or device, and execute the instructions. The memory 108 may contain, store, communicate, propagate or transport the program for use by or in connection with the instruction execution system, apparatus, or device. Examples of memory 108 may include an electrical connection having one or more wires, a random access memory (RAM), a read-only memory (ROM), an erasable, programmable, read-only memory (EPROM or Flash memory), a portable computer diskette, or a portable compact disk read-only memory (CDROM). The memory 108 may be integral with the device 102, a stand-alone memory, or a combination of both. The memory 108 may include, for example, removable and non-removable memory elements such as RAM, ROM, Flash, magnetic, optical, USB memory devices, and/or other conventional memory elements.

In some aspects, the memory 108 may store the known characteristics of a number of people and various other data associated with operation of the system 100, such as the computer program and code segments mentioned above, or other data for instructing the device 102 and other device elements to perform the aspects described herein. The various data stored within the memory 108 may be associated within one or more databases (not shown) to facilitate retrieval of the information, e.g., via the external devices 114 or the network 116. Although the memory 108 as shown in FIG. 1 is integrated into the device 102, it should be appreciated that memory 108 may be stand-alone memory positioned in the same enclosure as the device 102, or may be external memory accessible by the device 102.

In an aspect, the display 110 may be configured to display various information relating to the system 100 and its underlying operations. For example, a notification device may be included (not shown) for indicating the sensed biometric characteristic or the sensed signal fail to match the known characteristics of the person and may include an audible alarm, a visual alarm, and/or any other notification device.

In an aspect, the device 102 may also include input/output mechanism 112 to facilitate exchanging data and other information among different components within the device 102, or with various the external devices 114 or systems via the network 116.

For example, various I/O ports may be contemplated including a Secure Disk Digital (SD) card slot, Mini SD Card slot, Micro SD Card slot or the like for receiving removable SD cards, Mini SD Cards, Micro SD Cards, or the like, and a USB port for coupling with a USB cable communicatively coupled with another computing device such as a personal computer. In some aspects, the input/output mechanism 112 may include an input device (not shown) for receiving identification information about a person-to-be-identified. The input device may include a ticket reader, a credit card reader, an identification reader, a keypad, a touch-screen display, or any other device. In some other aspects, as described above, the input/output mechanism 112 may be configured to enable the device 102 to communicate with other electronic devices through the network 116, such as the Internet, a local area network, a wide area network, an ad hoc or peer to peer network, or a direct connection such as a USB, Firewire, or Bluetooth™ connection, etc. In one example, known characteristics about persons may be stored and retrievable in remote databases or memory via the network 116. The input/output mechanism 112 may thus communicate with the network 116 utilizing wired data transfer methods or wireless data transfer methods such as WiFi (802.11), Wi-Max, Bluetooth™, ANT®, ultra-wideband, infrared, cellular telephony, radio frequency, etc. In an aspect, the input/output mechanism 112 may include a cellular transceiver for transmitting and receiving communications over a communications network operable with GSM (Global System for Mobile communications), CDMA (Code Division Multiple Access), or any other known standards.

The device 102 may also include a power source (not shown) for providing electrical power to the various components contained therein. The power source may include batteries, battery packs, power conduits, connectors, and receptacles operable to receive batteries, battery connectors, or power cables.

In an aspect, the device 102 may be installed and positioned on an access control entry point (not shown) such as a gate, locked door, etc. for preventing persons from accessing certain areas until the device 102 determines that the sensed biometric characteristic and/or signal match the known characteristics. In some other aspects, as shown in FIGS. 2-4, the device 102 may be a stand-alone, compact, handheld, and portable device. In one example, one may use such a stand-alone, compact, handheld, and portable device to protect sensitive documents or information that are electronically stored and accessed on the Internet and/or an intranet. In some aspects, a concurrent realtime identity verification facility access unit may use biometric signature data to create interchangeable authentication for a variety of uses (e.g., office, home, smart phone, computer, facilities).

Figure 5:
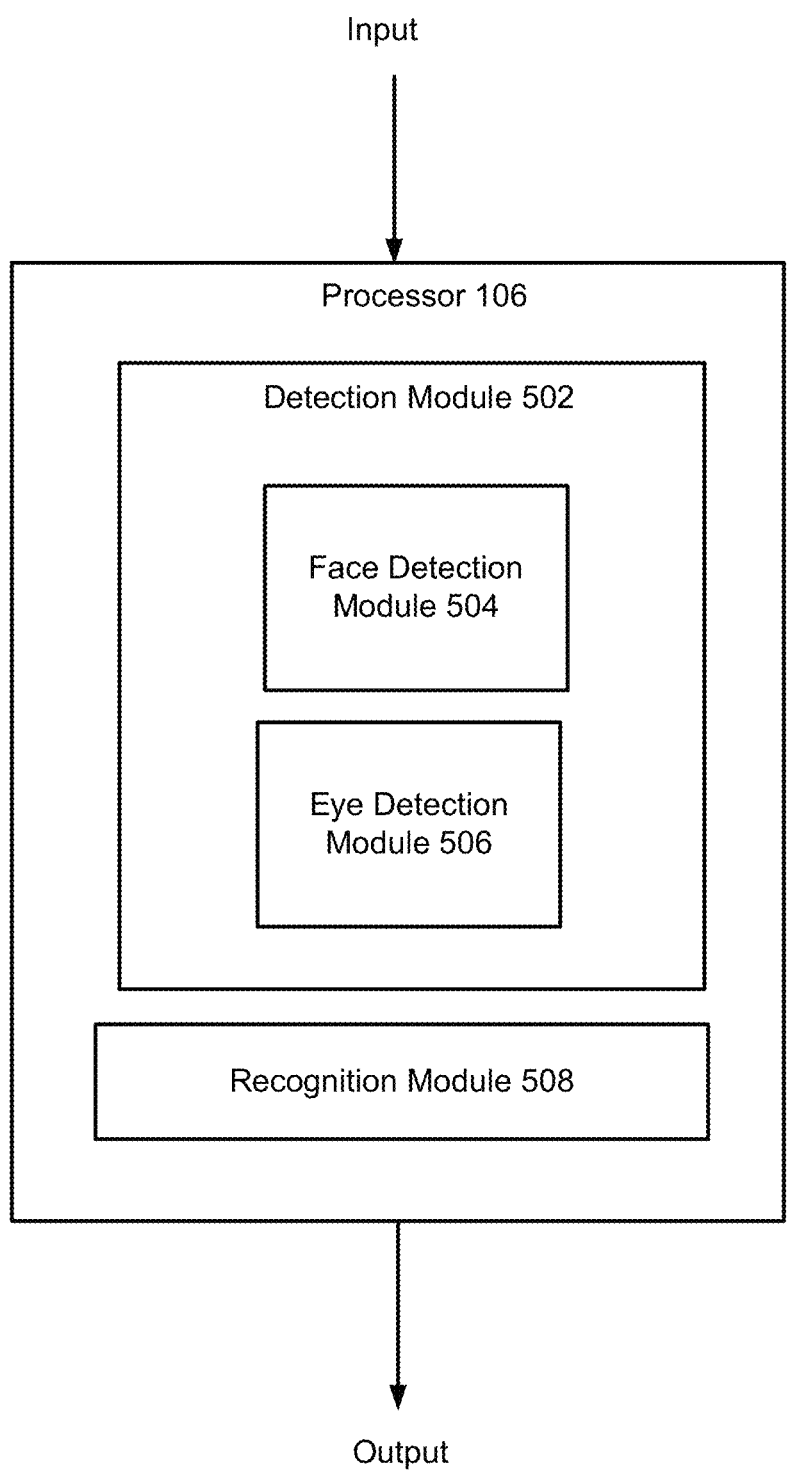
FIG. 5 is a block diagram of an example processing component of a concurrent real-time identity verification and authentication device, in accordance with some aspects of the present disclosure.

Referring to FIG. 5, the processor 106 in FIG. 1 may be configured to include, among other features, a detection module 502 and a recognition module 508 for providing concurrent real-time or near real-time identity verification and authentication with keyless access to authorized requesters to secured facilities or information. The detection module 502 may include a face detection module 504 for detecting facial features of a requester. The detection module 502 may include an eye detection module 506 for identifying the locations of the eyes of a requester. In some implementations, the detection module 520 may include one or both the face detection module 504 and/or the eye detection module 506. In some aspects, the processor 106 may receive inputs (digital or analog) from the sensor(s) 104.

Figure 6:
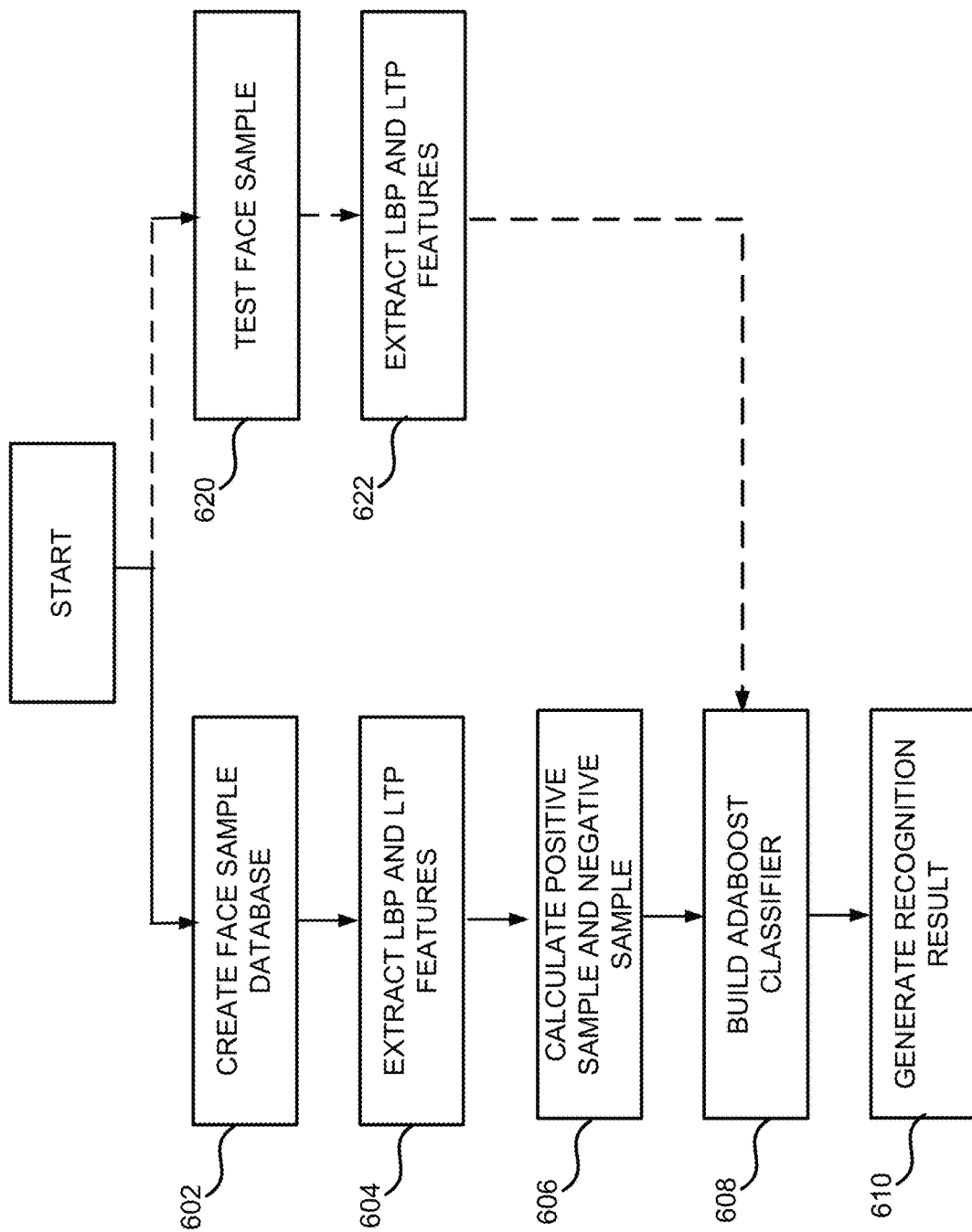
FIG. 6 shows a flow diagram of a facial recognition method, in accordance with some aspects of the present disclosure.

FIG. 6 describes an example procedure of selecting key features from a database with a large number of facial information and building one classifier which can distinguish different faces accordingly. LBP and LTP may be used to provide a full description of face information, and then with the use of an adaptive boosting ("adaboost") learning algorithm, one may select key features and build a classifier to distinguish different faces by creating biometric signature data. This biometric signature data may be used to create universal verification and authentication that can be used for a variety of applications (e.g., computer, building access, smartphone, automobile, data encryption) with varying degrees of access and security (e.g., access to network, but heightened security for requester computer). At block 602, create face sample database. For example, the processor 106 and the recognition module 508 may create a face sample database using unrecognized face samples. In one implementation, the processor 106 and the recognition module 508 may store, into the memory 108, 1000, different persons with each person showing 10 different postures and/or expressions.

At block 604, extract LBP and LTP features. For example, the detection module 502 and/or the face detection module 504 may extract LBP and LTP features from different blocks in different positions of each face sample.

At block 606, calculate positive sample and negative sample. For example, at least one of the face detection module 502, the face detection module 504, and the eye detection module 506 may calculate the feature absolute value distance for the same position of any two different images from one person and set this distance as positive sample feature database. Further, the face detection module 502 and the face detection module 504 may jointly or separately calculate the feature absolute value distance for the same position of any two different images from different person and set this distance as negative sample feature database.

At block 608, build adaboost classifier. For example, the face detection module 502 and the face detection module 504 may select the most distinguishable key feature from the candidate feature database with adaboost and create a face classifier.

At block 610, generate recognition result. For example, the recognition module 508 may generate recognition result. Once there is a fixed dataset of macro blocks and the specific LPB ranging from 1 to 255 is determined, a value is assigned to that unit of the dataset based upon the number of pixels within the block that satisfy that specific LBP. For example, assuming a 10×10 macro block in unit number 1 of 255 and LBP of 20, the method 600 determines the number of pixels in the histogram that fall within that LBP of 20 on scalar value. The method 600 calculates scalar value and then normalize value in a second array to address the problem of determining value within various sized macro-blocks. The scalar value based upon the known method was based on size of macro-block where the maximum value could be from 100 to 1600 depending upon the size of the macro-block. The scalar value in this second array may now a percentage of the total pixels available in that macro block to normalize the data for the subsequent assessment. Normalization causes the data to not be skewed based on the size of the macro block. After normalization under the improved method, each unit of the data set in this second array has the same weight. This normalized data may be then sorted to establish and assign a value from 1-2165 where the scale reflects the highest normalized value going to the top of the sort. For example if dataset 2000 had the highest value in the array it would be assigned a value of 1 with descending value reflecting the datasets that have lower values. The second normalized array may then be converted to a third simulated dna sequencing array where the position is established within this third array based upon its value in previous sort. The third array assesses the position and calculates the differences between where the data set appears in the sequence (e.g., ranking distance). This improved method analyzes traits as opposed to scalar value based upon the uniqueness of traits within the face and not merely on scalar values.

At block 620, test face sample. For example, the detection module 502 may optionally test face samples.

At block 622, extract LBP and LTP features. For example, the detection module 502 and/or the face detection module 504 may extract LBP and LTP features from different blocks in different positions of each face sample.

Further, online recognition may include the following steps:

(1) Calculate the offline stage extracted key feature of different blocks in different positions for face sample to be identified.

(2) Calculate the key feature selected from step (1) with that of each face sample in database and determine whether they belong to the same person or not. If calculated distance is less than the set threshold, it may be determined that they are the same person, otherwise it may be determined that they are not.

Figure 7A:
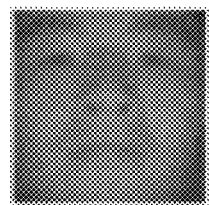
FIG. 7($a$) shows a facial image for a person, in accordance with some aspects of the present disclosure.
Figure 7B:
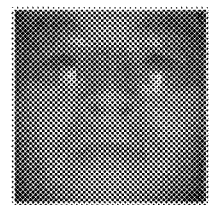
Figure 8:
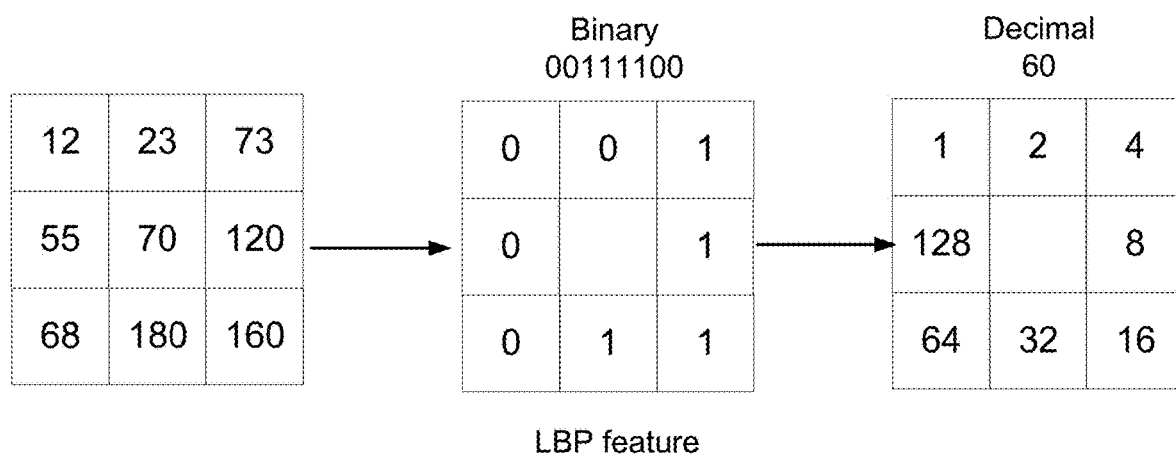
FIG. 8 shows an example process for calculating local binary pattern (LBP) feature, in accordance with some aspects of the present disclosure.

As shown in FIG. 8, an example process starts with creating a face database with different postures and different expressions. For example, one may include the images of, e.g., 1000, different persons and each person shows, e.g., 10, images differently. FIG. 7(a) shows the different face image of one same person, and FIG. 7(b) refers to the different face image of different person.

Figure 9:
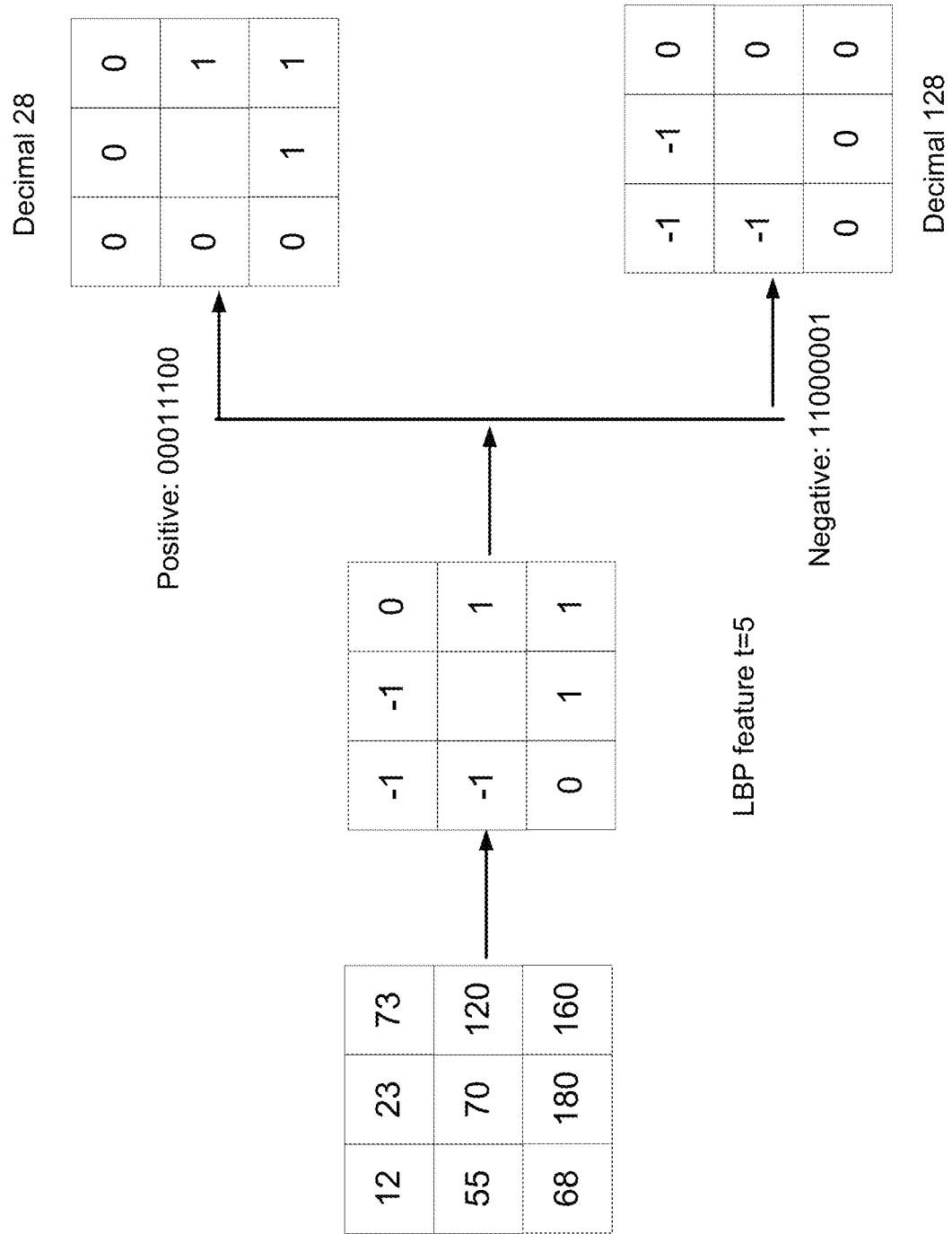
FIG. 9 shows an example process for calculating local ternary pattern (LTP) feature, in accordance with some aspects of the present disclosure.

LBP and LTP may be used to describe face. FIG. 8 shows a calculating process of LBP features, and FIG. 9 shows a calculating process of LTP features. In order to obtain as many features to describe face information, different block size may be divided on different positions of face sample. For example, face size can be 100×100, block size may be w×h, w and h values can range from 2 to 100, and 7837 blocks may be selected as a result. The identification system 100 may select the bin features of LBP and LTP on different block size and make it as the final candidate feature database.

The next step is to calculate positive samples and negative samples. The bin feature absolute value distance of the same position for different images from a same person may be calculated and set as the positive sample. Additionally, the bin feature absolute value distance of same position for different persons may be calculated and set as the negative sample. For example, the result may involve calculating 32356 positive samples and 58747698 negative samples.

Thereafter, the key bin feature that can distinguish all positive and negative samples among the large number of feature database may be selected with a learning algorithm. For example, one may choose the learning algorithm of discrete adaboost to select feature and build a classifier.

An example algorithm of using adaboost to classify may include the following computational steps:

1. Given f as the maximum negative sample error rate, d as the minimum positive sample correct rate, $F_{tar}$ as the target of negative sample error rate, and $D_{tar}$ as the target of positive sample correct rate that cascade classifier has to achieve. P, N are the positive and negative database, respectively.

2. Set $F_0=1.0$, $D_0=1.0$, and i=0;

3. When $F_i > F_{tar}$, i=i+1, $n_i$=0, $F_i=F_{i-1}$; when $F_i > f x F_{i-1}$, $n_i=n_{i+1}$.

4. Compute the strong classifier with n features via adaboost in database P and N; calculate $F_i$ and $D_i$ for current cascade classifier, adjust the threshold value of current strong classifier until the rate is no less than $d \times D_{i-1}$, N is nonempty set.

5. If $F_i > F_{tar}$, classify the currently obtained cascade classifier in other negative sample image and determine, put wrongly determined image into N.

1) Given n computing sample $(x_i, y_i), \ldots, (x_n, y_n)$, $y_i$=0, 1, $x_i$ presents negative sample label and positive sample label, respectively.

2) Initialize weight $$\omega_{l,i} = \frac{1}{2m}, \frac{1}{2l},$$

where the number of positive samples is 1 and the number of negative samples is m.

3) Try t from 1 to T and run below steps repeatedly:
a) Normalize weight $\omega_{t,i} = \omega_{t,i} / \Sigma_{j=i}^n \omega_{t,i}$
b) Compute a weak classifier 11, for each feature $f_1$ and mark the error rate of this classifier $\in_j = \Sigma_i \omega_{t,i} |h_j(x_i - y_i)|$ c) Find out classifier $h_t$ with lowest error rate Wt among all weak classifier computed from last step, d) Update weight $\omega_{t+1,i} = \omega_{t,i} \beta_t^{1-e}$ among which $\beta_t = \in_t/(1-\in_t)$, If x, is correctly classified, $e_i$=0. Otherwise $e_i$=1.

Figure 10:
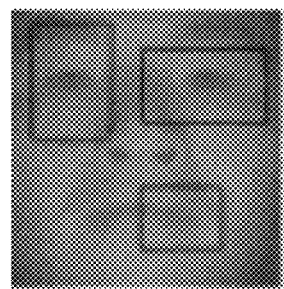
FIG. 10 shows positions of three example key features selected among one or more face images, in accordance with some aspects of the present disclosure.

Get the strong classifier lastly: if $\Sigma_{t=1}^T \alpha_t h_t(x) \geq \frac{1}{2} \Sigma_{t=1}^T \alpha_t$ then h(x)=1, otherwise h(x)=0. There, $\alpha_t$=log $1/\beta_t$ FIG. 10 shows the position of the first three key features selected among face image by taking online testing for face database of 100 persons based on offline selected features and classifier.

Figure 11:
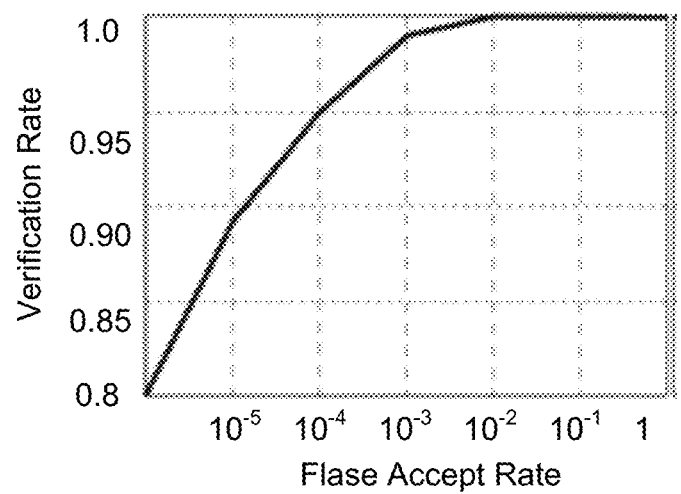
FIG. 11 shows an example of a receiver operating characteristic (ROC) curve for testing a face database, in accordance with some aspects of the present disclosure.

FIG. 11 shows recognition results for 100 persons, wherein X axis represents false accept rate, which means the wrongly identified rate of face samples. Y axis represents verification rate, which means the rate of face samples correctly recognized. As shown in FIG. 11, when the false accept rate is below $10^{-4}$, it may achieve 95% recognition rate. The face recognition in this example not only improves the robustness of face sample, but also reduces its computational complexity thus improves the face recognition significantly.

Referring back to FIG. 5, in some aspects, the detection module 502 may be configured to use, among other features, a face detection module 504 and an eyes detection module 506 for processing the acquired image of the person-to-be-identified as follows.

Face Detection Module 504

Inputs: Acquired frontal face image (grey image), face classifier

Outputs: Face frame positions, and the number of faces

Flow:

a. Reduce the acquire frontal face image to user-defined size b. Calculate an integral image of the reduced image c. Initialize a traverse window based on the size defined by the face classifier, e.g., 20×20 d. Move the traverse window on the integral image from left to right and then from top to bottom with each move distance corresponding to a user-defined distance. However, if the user-defined distance is zero, set the move distance as 1/20 of the width of the traverse window.

e. Use the face classifier to determine whether the current position of the traverse window defines a valid portion of a face. If so, save the current rectangular frame position of the traverse window as results.

f. After traversing the entire integral image, increase the width and the length of the traverse window by 1.1 times and repeat step e until the size of the traverse window exceeds the size of the image, or the buffer allocated for saving the results is used up.

g. Return to face frame position and faces

Eyes Detection Module 506

Inputs: Acquired frontal face image (grey image), face frame positions, classifier for both left and right eyes, left eye classifier, right eye classifier, left eye coarse detection classifier, right eye coarse detection classifier Outputs: frame position for both eyes, frame position of left eye, and frame position of right eye Flow:

a. Obtain face image from the acquired frontal face image b. If user-defined classifier for both left and right eyes is available, use correspondingly defined face detection function to detect both the left and right eyes of the obtained face image. If not, estimate the positions of both the left and right eyes based on experience.

c. If user-defined left/right eye course detection classifier for the left/right eye is available, detect the left/right eye on the corresponding half of the obtained face image. Further, based on the coarse detection result, determine whether the detected human subject is wearing glasses or not. If glasses are present, detect the obtained face image and return with results. If no glasses are present, continue to detect the obtained face image based on the coarse detection result and return the detection result without considering the presence of glasses. (If user-defined classifier for glasses-wearing subject is not available, detect the obtained face image without considering the presence of glasses.)

d. If user-defined course detection classifiers are not available, determine whether glasses are present by directly detecting the left/right half of the obtained face image. If glasses are present, detect the obtained face image and return with results. If no glasses are present, continue to detect the obtained face image based on the coarse detection result and return the detection result without considering the presence of glasses. (If user-defined classifier for glasses-wearing subject is not available, detect the obtained face image without considering the presence of glasses.)

e. Return

In some aspects, the processor 106 may further use, e.g., a recognition module 508, to extract pertinent facial features obtained from the detection module 502 for comparing against known characteristics and/or information of a number of authorized people as follows.

Recognition Module 508

Normalization

Inputs: to-be-normalized image (grey image), the coordinates of the centers of both the left and right eyes on the image axis (the origin is located at the left top corner of the image). The meanings of parameters: lx refers to the x coordinate of the center point of the left eye (horizontal direction) in the output image divided by the width of the output image, and $1y$ refers to x coordinate of the center point of the left eye (vertical direction) in the output image divided by the height of the output image.

Output: output image

Feature Extraction

Inputs: Normalized image (grey image) and feature types

Outputs: If output buffer is NULL, return feature dimensional degrees. Otherwise, assume the size of the output buffer equals the feature dimensional degrees, write the features of the image into the buffer, and return feature dimensional degrees. Certain features are associated with certain image size. For example, #6 feature may require the image size of 100 by 100. Therefore, when the input image fails corresponding defined image size requirement, a result of zero can be returned.

Feature Comparison

Inputs: Two features to be compared and the comparison method

Output: The smaller the comparison result (a floating point), the higher the similarity.

Obtaining Algorithm Information

Function: instruct the requester to correctly assign parameters for the algorithm Input: algorithm type based on the usage context Outputs: parameters information of the algorithm including feature type, feature dimensional degrees, normalized image size, the minimum distance, suggested range, and distance type.

Many of the systems and methods described above can be used to create Biometric Signature Data ("BSD") files that allow a system to identify and distinguish requesters with a high degree of accuracy. Various implementations of the present disclosure may employ the BSD files to create an encryption/decryption key, thus increasing the security of such keys. Examples of the present disclosure can generate asymmetric keys based on one or more BSD files in such a way that by utilizing a biometric sensor, a person's biometric measurement can act as the person's private key. Implementations of the present disclosure may also incorporate BSD files into digital rights management (DRM) security in such a way that files cannot be decrypted or accessed by anyone other than the requester or group of requesters intended, or encrypted in a way that the original owners, such as a business, can no longer access the files. Accordingly, by using implementations of the present disclosure employing BSD files, when a file is accessed, there can be assurance of the identity of the requester who accessed the file.

BSD files can be generated by the algorithmic analysis of data from an A/D IR and/or UV sensor. Accordingly, many of these elements can be considered when constructing the private key of the asymmetrical pair (i.e., analog and/or digital values). Thus, in some implementations of the present disclosure, multiple elements of a sensor can contribute real-time data or real-time analog data related to a recognition event in order to de-encrypt, thus ensuring a real-time event (i.e., the actual measurement of the intended person) has triggered the authentication.

Figure 12:
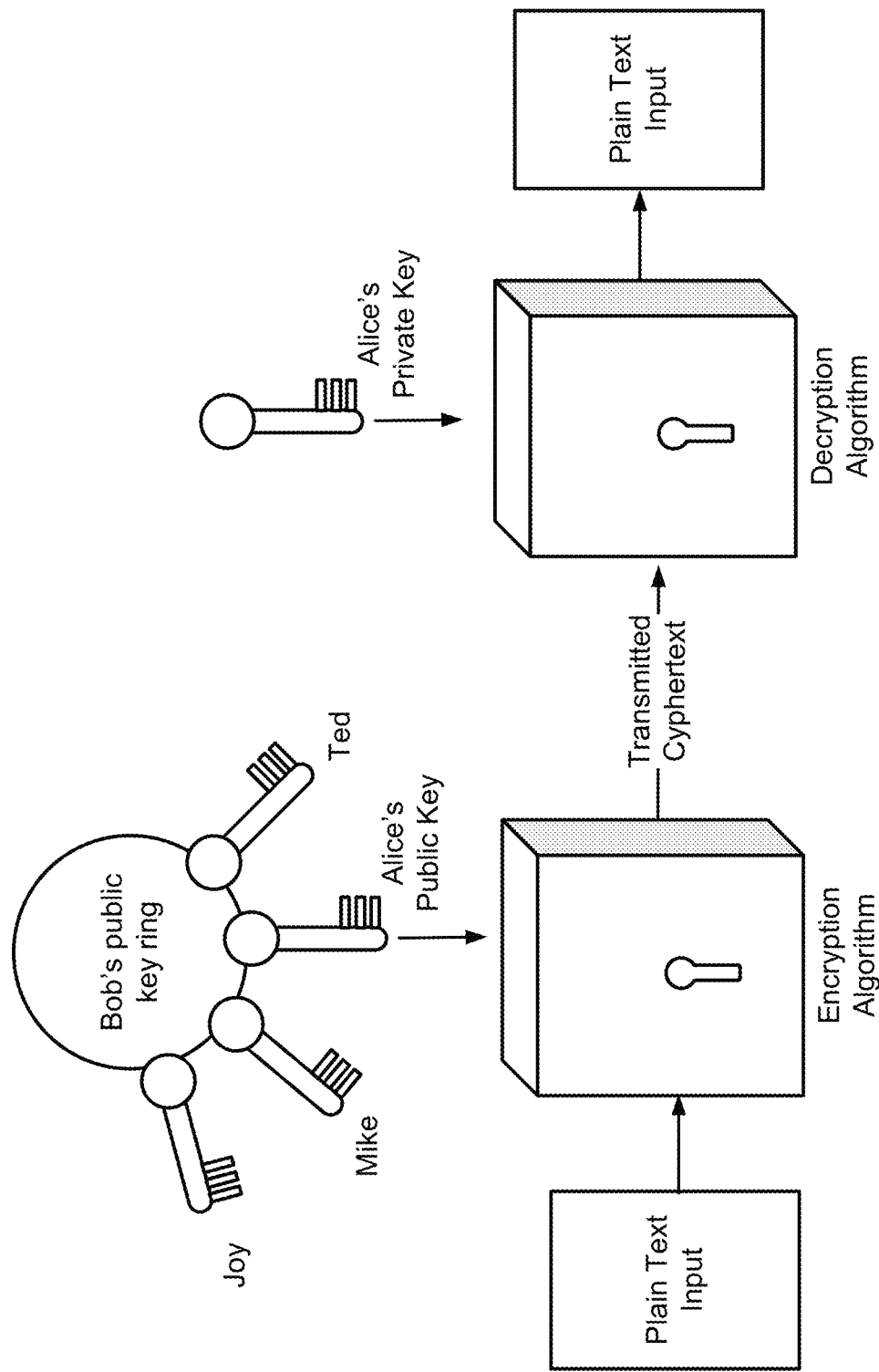
FIG. 12 illustrates an example of biometric, asymmetric encryption for confidentiality, in accordance with some aspects of the present disclosure.
Figure 13:
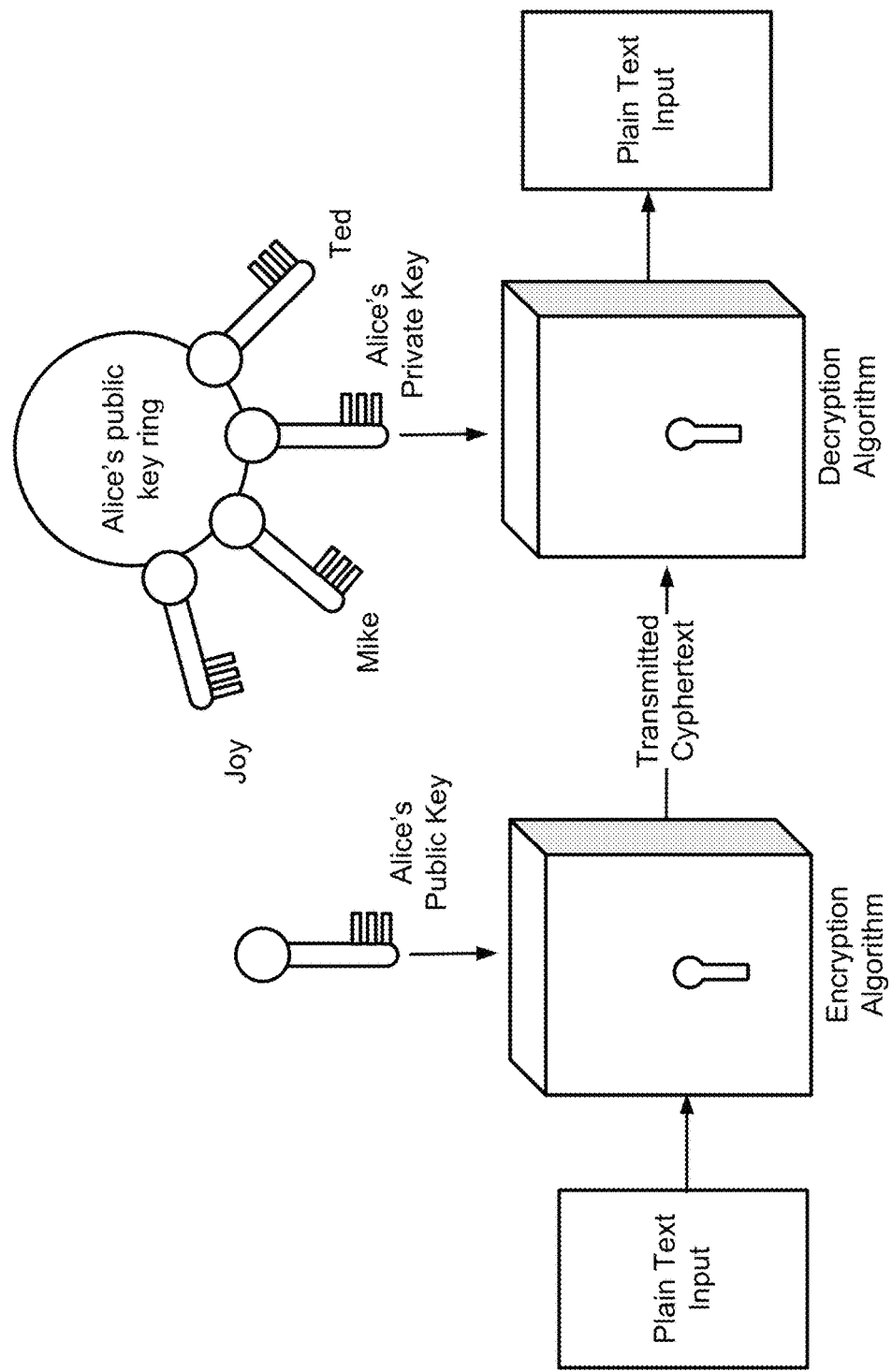
FIG. 13 illustrates another example of biometric, asymmetric encryption for authentication, in accordance with some aspects of the present disclosure.

As shown in FIGS. 12-13, in accordance with some implementations of the present disclosure, messages can be sent as follows. A requester can register, e.g., on a computer, and create a public key for the requester. The requester than then publish the public key so that the key is publicly known. Other people, systems, or entities, can use the requester's public key to encrypt messages for the requester and send those messages to the requester. The requester can decrypt the message using her private key created by one or more live BSD files associated with the requester. Accordingly, the sender of the message is ensured that the requester is actually the person decrypting the message because the private key used to decrypt the message can be generated by the requester's live biometric data. These systems and methods for encryption provide substantial advantages over conventional systems and methods. For example, instead, of simply matching anonymous asymmetrical codes, by using BSD filed in the encryption process, authentication because inherent in the key itself.

Various implementations of the present disclosure can also improve DRM. For example, DRM rules can allow for additional content to be added to a file and additional rules to be required. DRM rules can be expressed in many rights management languages known in the art, including but not limited to, XrML (extensible rights markup language), XMCL (extensible media commerce language), ODRL (open digital rights language), and the like. Rules can specify the actions that are permitted (e.g., decrypting, encrypting, transferring, copying, editing, etc.). The rules can also specify the people authorized to perform actions and the conditions under which these actions are permitted. BSD files can be used to authenticate a requester to determine whether the requester is one of the people specified in the rules.

Various systems and methods for biometric encryption and authentication can also find application in corporate settings where, e.g., employees use corporate devices for personal use as well as business, or when, e.g., an employee uses a personal device and the corporate digital assets are transferred to and from the personal device. By applying rules to documents that have certain digital signatures, there may be controllable segmentation between private and business concerns. Both parties may have access to the parts they are entitled to access but can be prevented from accessing parts that are not entitled to access. For example, possible applications include, but are not limited to, providing remote access, making purchases, and conditional security.

In the case of remote access, various implementations of the present disclosure can generate BSD files used to authenticate a requester, thus providing secure access for any remote network connection, i.e., VPN server, secure access to network email, and/or company proprietary information, from a remote device.

Additionally, biometric authentication techniques of the present invention can be used to make authenticated online purchases/transactions. For example, spending limits can be based on requester or group profile for an account. In order for a requester to make a purchase, a system can use the biometric authentication techniques of the present disclosure to authenticate the true identity of that requester to verify the requester is entitled to make the desired purchase.

Biometric authentication techniques can also be used to provide conditional security to various digital files. For example, files that contain sensitive information can only be accessed by authorized requesters, which can be authenticated using the requester's live BSD files.

Biometric Encryption and Authentication Application to Digital Cinema

The biometric encryption and authentication techniques described herein find many applications in the digital cinema industry. Movies are popular commodities, especially pre-DVD release. In order to maximize both production efficiencies and distribution opportunities, movies need to be accessed and handled by many different strata of requesters. Persons skilled in the art appreciate that techniques capable of protecting digital assets in the digital cinema industry can be used to protect digital assets in almost any industry. Accordingly, the principles described herein are not limited to application in the digital cinema industry, but may instead be applied to any industry for a similar purpose.

Digital cinema security views itself as an end-to-end process from production via distribution to consumption. SMPTE DC28, the body responsible for digital cinema standards, has identified five separate areas of digital cinema: (1) capture; (2) production; (3) Master (cinema, home, video, trailers, test screenings); (4) distribution (satellite, fiber, packaged); and (5) exhibition (digital projector security). In each area identified by SMPTE DC28, a movie is vulnerable to theft. In order to discourage theft, movies can be encrypted prior to distribution. Movies are then typically stored in their encrypted state in the theater until showtime. At showtime, the movie is decrypted and decompressed. This decryption/decompression may take place in a server or in a projector.

In an exemplary SMPTE DC28 process, DC28.4 can represent the conditional access portions of the cinema delivery system. Modem DRM encryption methods have proven sufficient to withstand unwarranted deciphering attempts, but securing the keys has become a problem. From capture to exhibition to distribution, a movie is encrypted and decrypted multiple times. Accordingly, various biometric encryption and authentication techniques discussed herein can be applied to one of more of the encryption, decryption, and authentication steps, in accordance with various implementations of the present disclosure.

Figure 14:
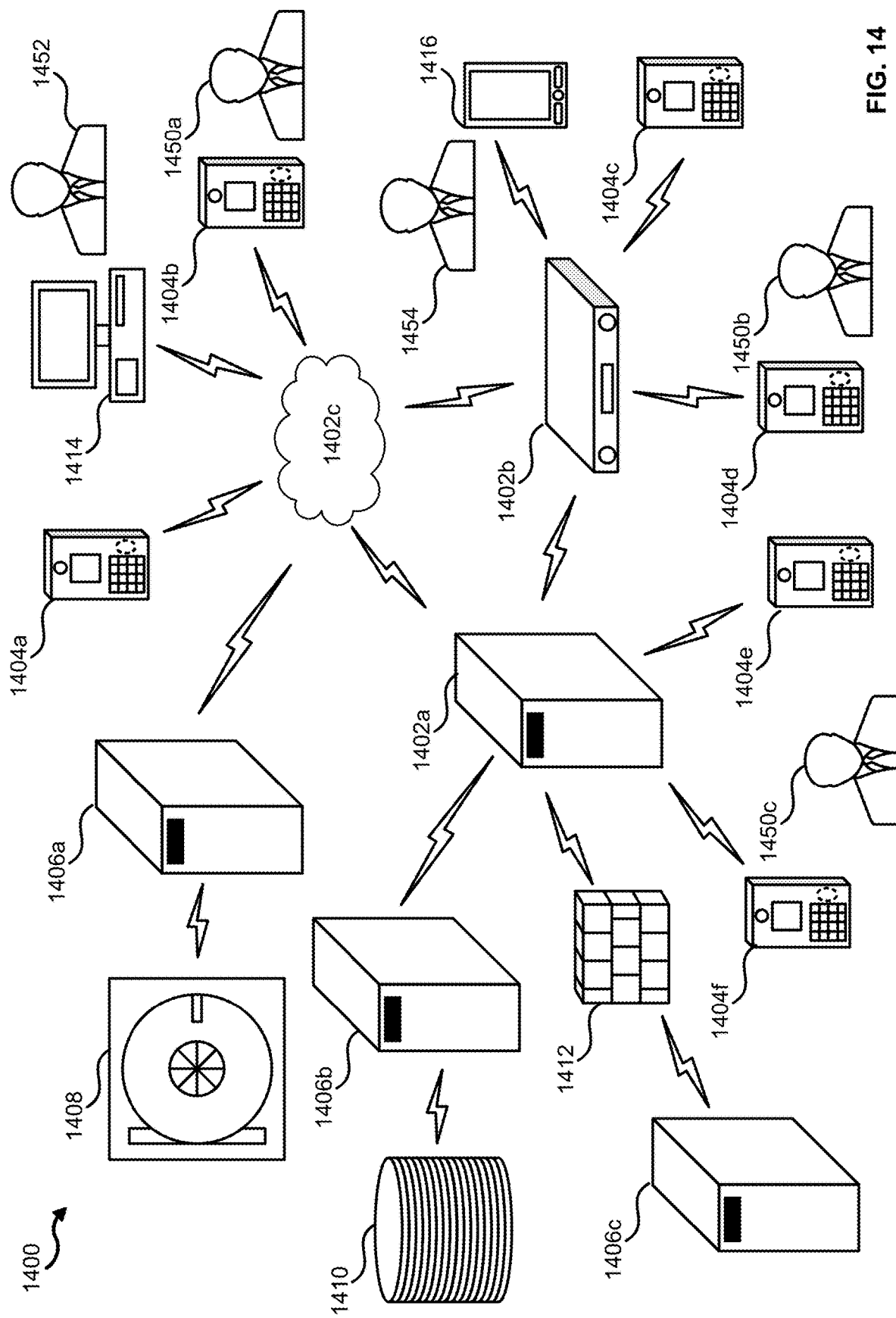
FIG. 14 illustrates a schematic view of an example of an environment for implementing one or more gateways for access control.

Referring to FIG. 14, an example of an environment 1400 for managing data may rely on a first gateway 1402*a*, a second gateway 1402*b*, and a third gateway 1402*c* to route data via wired and/or wireless communication links. The first gateway 1402*a* may be implemented as a software-based gateway virtualized in a computer system. The second gateway 1402*b* may be a standalone device that routes data as described below. The third gateway 1402*c* may be a cloud-based gateway. Other architectures are possible.

In certain implementations, the gateways 1402 may perform several functions including managing the movement of data to and from the biometric sensor as described below, providing a networked solution that efficiently moves binary facial data between devices, and when clustered together (physical and virtual), providing a high availability solution for security designs. The gateway 1402 may receive credentialing data through an XML file structure. By monitoring and actively consuming the XML, files, the gateway 1402 may be able to utilize a standardized universal interface agnostic to the programming language, operating system and type of connectivity of the data source, support physical and logical access control requirements within the same method, offer an interface that supports simultaneous connectivity from different system types, and/or support either live or batch processing of credentials, including the immediate recovery of a credential system through file replacement.

In certain aspects, data stored in the gateways 1402 may be stored in files based on Javascript Object Notation format.

The environment 1400 may include one or more ECD ECDs 1404, e.g., ECD-a 1404*a*, ECD-b 1404*b*, ECD-c 1404*c*, ECD-d 1404*d*, ECD-e 1404*e*, and ECD-f 1404*f* The ECDs 1404 may also be referred to as edge capture devices. The ECD ECDs 1404 may transmit data to the gateways 1402 to be routed to another device within the environment 1400. For example, the ECD-a 1404*a* may send a biometric template and/or identity information of a person to the third gateway 1402*c*. The third gateway 1402*c* may send one or more biometric templates to the ECD-a 1404*a* for performing matching operations.

Still referring to FIG. 14, in certain implementations, the environment 1400 may include an access control server 1406*a*, an enterprise server 1406*b*, and a third party server 1406*c*. The access control server 1406*a* may be communicatively coupled to one or more access controlled entry points 1408 via a wired or wireless communication link. The enterprise server 1406*b* may be communicatively coupled to a storage device 1410. The storage device 1410 may be a network drive, local hard drive, flash drive, tape drive, or other suitable storage media.

Still referring to FIG. 14, during operations for example, the ECD-b 1404*b* may receive a biometric template of a first requester 1450*a*. The first requester 1450*a* may attempt to access one or more access controlled entry points 1408 controlled by the access control server 1406*a*. The one or more access controlled entry points 1408 may include a vault, lock, secure door, secure gate, equipment or machinery, computing device, digital storage device, database, or file, for example. In some examples, the one or more access controlled entry points 1408 may be an access controlled door or gate of an infrastructure, such as a warehouse, office building, restricted area, etc. The biometric template of the first requester 1450*a* may include one or more of the fingerprints, voice patterns, iris patterns, facial features, signature patterns, shapes of the ears, retinal patterns, gait, hand geometry of the first requester 1450*a*.

In certain implementations, the ECD-b 1404*b* may extract the facial features of the first requester 1450*a*, and compare the facial features with the facial features of authorized personnel. If the facial feature of the first requester 1450*a* matches one of the facial features of the authorized personnel, the ECD-b 1404*b* may send a first positive match signal to the third gateway 1402*c*. The third gateway 1402*c* may route the first positive match signal to the access control server 1406*a*. Upon receiving the first positive match signal, the access control server 1406*a* may unlock one of the one or more access controlled entry points 1408 associated with the ECD-b 1404*b* to allow the requester 1450 access. If the facial feature of the first requester 1450*a* does not match one of the facial features of the authorized personnel, the first requester 1450*a* may not gain access to the entry point 1408 associated with the ECD-b 1404*b*.

Still referring to FIG. 14, in certain examples, the ECD-d 1404*d* may transmit a second positive match signal of a second requester 1450*b* at a first time and a third positive match signal at a second time of the second requester 1450*b* to the second gateway 1402*b*. The second gateway 1402*b* may route the second positive match signal and the third positive match signal to the first gateway 1402*a*, which may route the second and third positive match signals to the enterprise server 1406*b*. The enterprise server 1406*b* may use the second positive match signal and the third positive match signal to log access information associated with the second requester 1450*b*. For example, the enterprise server 1406*b* may record, into the storage device 1410, the first time as the arrival time of the second requester 1450*b* and the second time as the departure time on a work day. In another example, the enterprise server 1406*b* may record the first and second time as the number of accesses to the one or more access controlled entry points 1408 by the second requester 1450*b*. The enterprise server 1406*b* may also log, based on the information in the second and third positive match signals, the premises, equipment, files, locations, and information accessed by the second requester 1450*b*.

Referring still to FIG. 14, in certain implementations, the ECD-f 1404*f* may transmit a fourth positive match signal of the third requester 1450*c* to the first gateway 1402*a*. The first gateway 1402*a* may route the fourth positive match signal to the third party server 1406*c* through a firewall 1412. The firewall 1412 may filter information transmitted through the firewall 1412 and prevent malicious requesters from gaining unauthorized access. The fourth positive match signal may indicate to the third party server 1406*c* that the third requester 1450*c* gained access to the one or more access controlled entry points 1408. For example, the fourth positive match signal may indicate to the third part server 1406*c* that the third requester 1450*c* accessed a software that requires payment to the owner of the third party server 1406*c*.

Still referring to FIG. 14, in certain examples, a network administrator 1452 may install, manage, update, maintain, and/or control the software in the ECD ECDs 1404, the gateways 1402, the access control server 1406*a*, the one or more access controlled entry points 1408, the enterprise server 1406*b*, the storage device 1410, and/or the firewall 1412 via a workstation 1414. The workstation 1414 may be a desktop computer, laptop computer, tablet computer, hand-held computer, smartphone, or other suitable computer devices communicatively coupled via a wired or wireless connection to the third gateway 1402*c*. The network administrator 1452 may transmit software commands from the workstation 1414 to the third gateway 1402*c* to be routed to a destination. In some examples, the network administrator 1452 may upgrade the firmware in the ECD ECDs 1404. In other examples, the network administrator 1452 may install new software onto the access control server 1406*a*. In another example, the network administrator 1452 may perform maintenance operations, such as disk error check and defragmentation, on the storage device 1410. In yet another example, the network administrator 1452 may lock down or open the one or more access controlled entry points 1408 in an emergency.

Referring to FIG. 14, in some implementations, an employee 1454, such as a supervisor, may utilize a requester terminal 1416 to access information through the second gateway 1402*b*. The requester terminal 1416 may be a desktop computer, laptop computer, tablet computer, hand-held computer, smartphone, or other suitable computer devices communicatively coupled via a wired or wireless connection to the second gateway 1402*b*. In some examples, the employee 1454 may download information, such as work hours, arrival time, access history, utilization frequencies, using the requester terminal 1416.

In certain examples, data exchanges within the environment 1400 may be encrypted. Data transmissions between the gateways 1402 and the ECD ECDs 1404 may use advanced TLS v1.2 communications with a proprietary key management framework. Data transmitted via TLS v1.2 communications may be fully encrypted to remove the threat of exposure of the data to unwanted parties. The encryption of the data may be further protected by protecting the generation of the encrypted keys through the use of the biometric data as the seed for the generation of the keys. As such, data exchanged within the environment may be difficult to access by unauthorized requesters.

Further, the gateways 1402 may be used to manage the data and the creation of a blockchain for the requesters. The first gateway 1402*a*, the second gateway 1402*b*, and the third gateway 1402*c* may each include a blockchain wallet. The wallets will contain the requester personal credentials required to authenticate to any device or application. The wallets may be tied to the gateways 1402 to provide cybersecurity monitoring and to provide the interaction between the wallet and the facial recognition devices. The ECD ECDs 1404 linked to the personal blockchain may be able to enable a transaction in the blockchain. Communications between blockchain wallets, a ledger for the blockchain transactions, and the gateways 1402 may use the blockchain protocol. The personal blockchain will also extend to devices that verify more than one requester, like a bank ATM (not shown). The gateways 1402 will utilize location tracking to move the link binary facial data and the link to the blockchain ledger between shared devices to improve the security of the transactions and to manage the number of requesters held within each ECD 1404.

Figure 15:
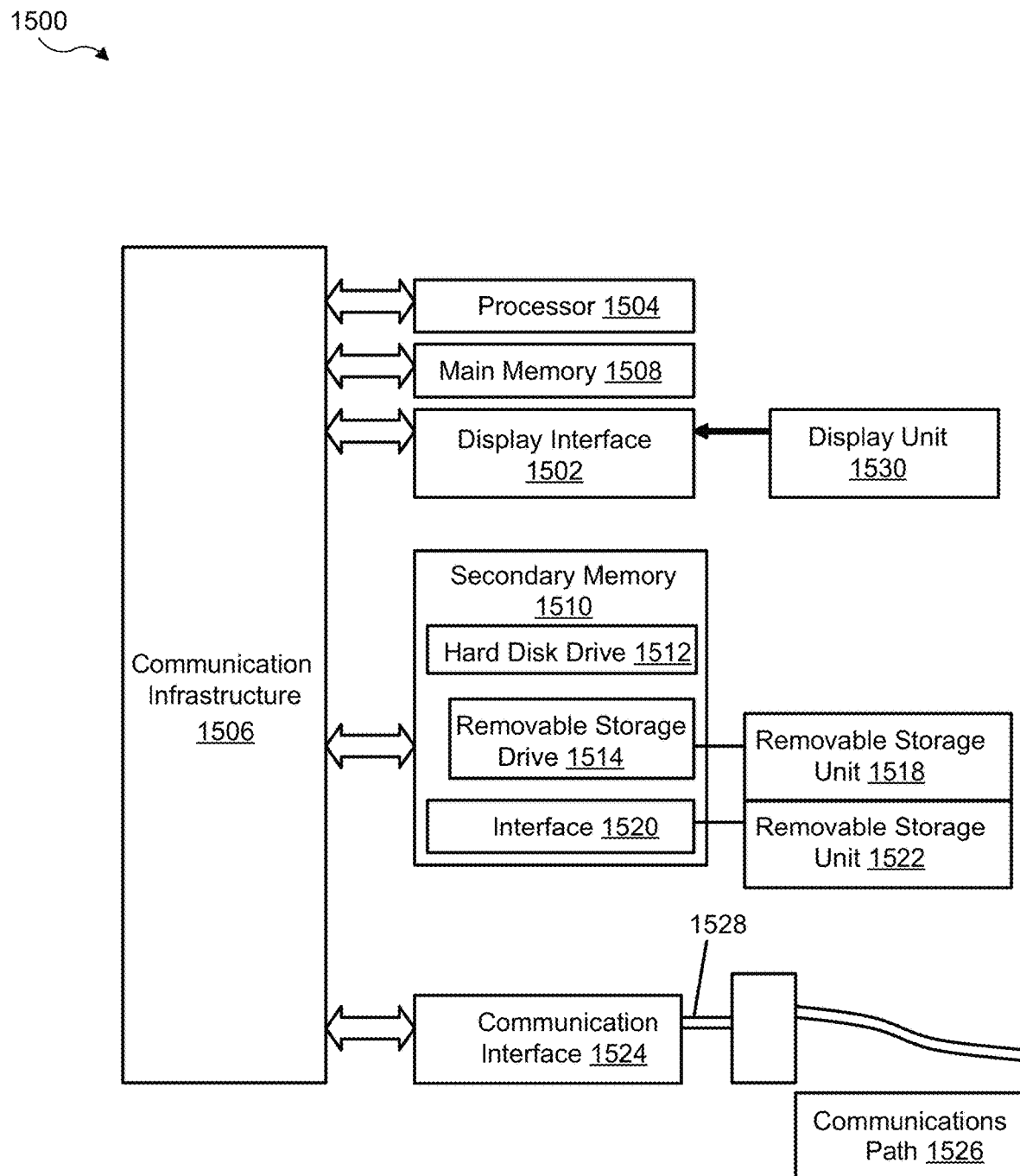
FIG. 15 illustrates an example of a computer system for implementing a method of managing data in accordance with aspects of the present disclosure.

Aspects of the present disclosure may be implemented using hardware, software, a cloud network, or a combination thereof and may be implemented in one or more computer systems or other processing systems. In an aspect of the present disclosure, features are directed toward one or more computer systems capable of carrying out the functionality described herein. An example of such the computer system 1500 is shown in FIG. 15. One or more of the gateways 1402, the servers 1406, the firewall 1412, the workstation 1414, and/or the requester terminal 1416 may be implemented based on the computer system 1500.

Referring now to FIG. 15, the computer system 1500 includes one or more processors, such as the processor 1504. The processor 1504 is communicatively coupled to a communication infrastructure 1506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The computer system 1500 may include a display interface 1502 that forwards graphics, text, and other data from the communication infrastructure 1506 (or from a frame buffer not shown) for display on a display unit 1530. Computer system 1500 also includes a main memory 208, preferably random access memory (RAM), and may also include a secondary memory 1510. The secondary memory 1510 may include, for example, a hard disk drive 1512, and/or a removable storage drive 1514, representing a floppy disk drive, magnetic tape drive, optical disk drive, universal serial bus (USB) flash drive, etc. The removable storage drive 1514 reads from and/or writes to a removable storage unit 1518 in a well-known manner. Removable storage unit 1518 represents a floppy disk, magnetic tape, optical disk, USB flash drive etc., which is read by and written to removable storage drive 1514. As will be appreciated, the removable storage unit 1518 includes a computer usable storage medium having stored therein computer software and/or data.

Alternative aspects of the present disclosure may include secondary memory 1510 and may include other similar devices for allowing computer programs or other instructions to be loaded into computer system 1500. Such devices may include, for example, a removable storage unit 1522 and an interface 1520. Examples of such may include a program cartridge and cartridge interface (such as that found in video game devices), a removable memory chip (such as an erasable programmable read only memory (EPROM), or programmable read only memory (PROM)) and associated socket, and other removable storage units 1522 and interfaces 1520, which allow software and data to be transferred from the removable storage unit 1522 to computer system 1500.

Computer system 1500 may also include a communications interface 1524. Communications interface 1524 allows software and data to be transferred between computer system 1500 and external devices. Examples of communications interface 1524 may include a modem, a network interface (such as an Ethernet card), a communications port, a Personal Computer Memory Card International Association (PCMCIA) slot and card, etc. Software and data transferred via communications interface 1524 are in the form of signals 1528, which may be electronic, electromagnetic, optical or other signals capable of being received by communications interface 1524. These signals 1528 are provided to communications interface 1524 via a communications path (e.g., channel) 1526. This path 1526 carries signals 1528 and may be implemented using one or more of a wire or cable, fiber optics, telephone line, cellular link, RF link and/or other communications channels. In this document, the terms "computer program medium" and "computer usable medium" are used to refer generally to media such as a removable storage drive 1518, a hard disk installed in hard disk drive 1512, and signals 1528. These computer program products provide software to the computer system 1500. Aspects of the present disclosure are directed to such computer program products.

Computer programs (also referred to as computer control logic) are stored in main memory 1508 and/or secondary memory 1510. Computer programs may also be received via communications interface 1524. Such computer programs, when executed, enable the computer system 1500 to perform the features in accordance with aspects of the present disclosure, as discussed herein. In particular, the computer programs, when executed, enable the processor 1504 to perform the features in accordance with aspects of the present disclosure. Accordingly, such computer programs represent controllers of the computer system 1500.

In an aspect of the present disclosure where the method is implemented using software, the software may be stored in a computer program product and loaded into computer system 1500 using removable storage drive 1514, hard drive 1512, or communications interface 1520. The control logic (software), when executed by the processor 1504, causes the processor 1504 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 16:
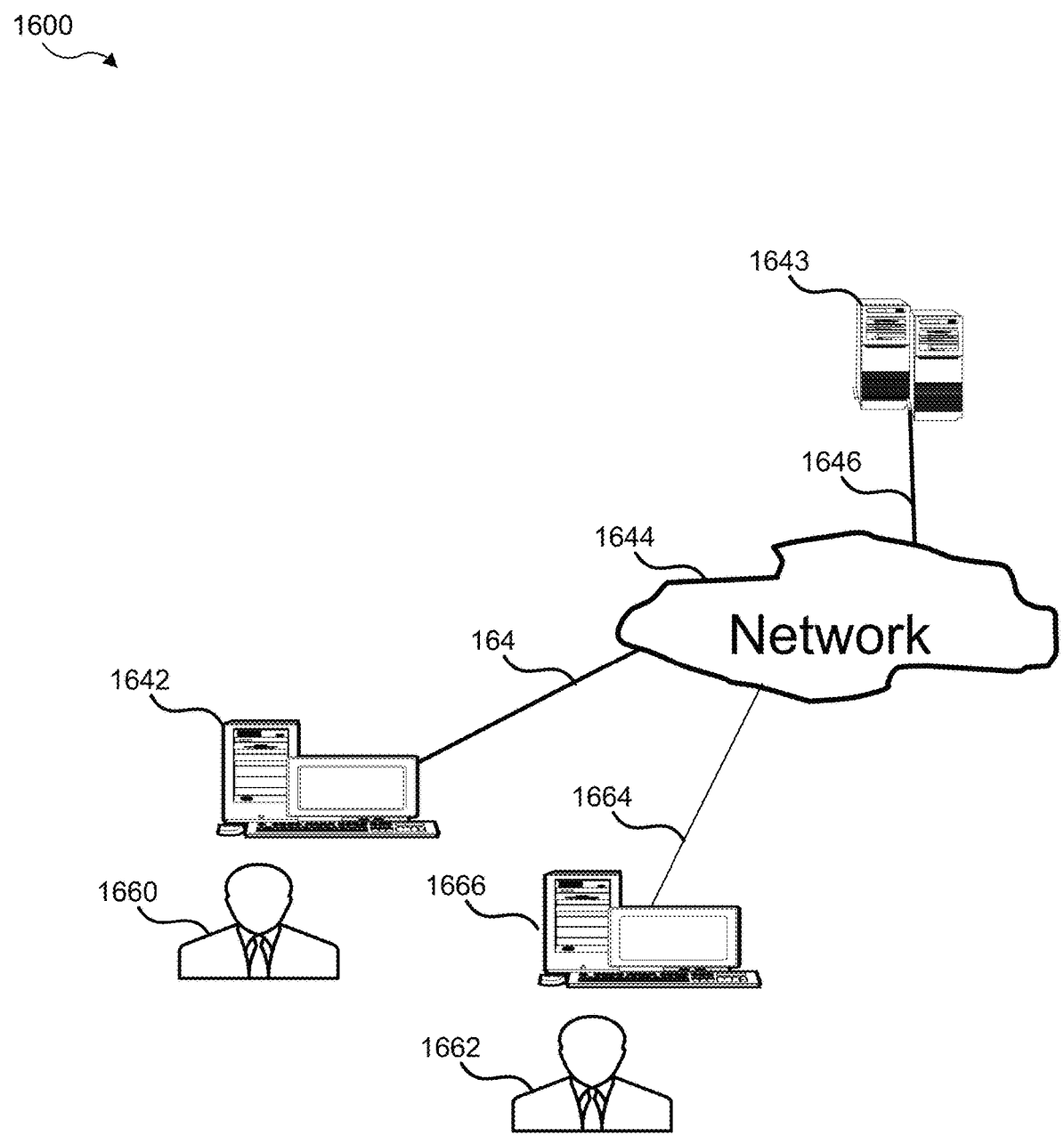
FIG. 16 illustrates a block diagram of various exemplary system components, in accordance with aspects of the present disclosure.

FIG. 16 illustrates a block diagram of various example system components, in accordance with an aspect of the present disclosure. FIG. 16 shows a communication system 1600 usable in accordance with aspects of the present disclosure. The communication system 1600 includes one or more accessors 1660, 1662 and one or more terminals 1642, 1666. In one aspect, data for use in accordance with aspects of the present disclosure is, for example, input and/or accessed by accessors 1660, 1662 via terminals 1642, 1666, such as personal computers (PCs), minicomputers, mainframe computers, microcomputers, telephonic devices, or wireless devices, such as personal digital assistants ("PDAs") or a hand-held wireless devices coupled to a server 1643, such as a PC, minicomputer, mainframe computer, microcomputer, or other device having a processor and a repository for data and/or connection to a repository for data, via, for example, a network 1644, such as the Internet or an intranet, and couplings 1645, 1646, 1664. The couplings 1645, 1646, 1664 include, for example, wired, wireless, and/or fiberoptic links. In another example variation, the method and system in accordance with aspects of the present disclosure operate in a stand-alone environment, such as on a single terminal.

Figure 17:
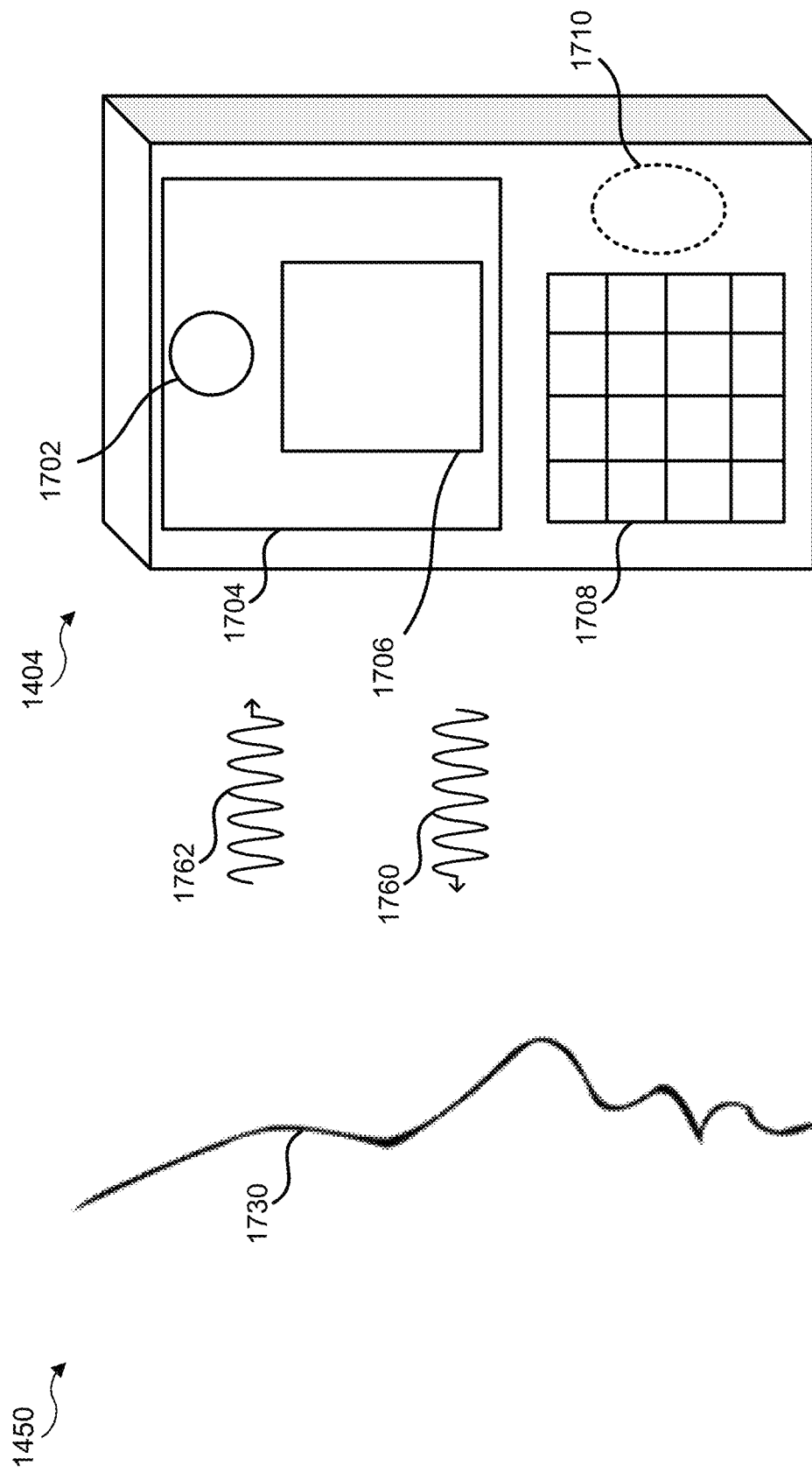
FIG. 17 illustrates an example of a ECD for identifying biometric templates, in accordance with aspects of the present disclosure.

Turning now to FIG. 17, an example of a ECD 1404 that is configured to perform access control may analyze a biometric template of a requester 1450 to determine whether the requester 1450 is authorized to gain access to an entry point (not shown) associated with the ECD 1404. The ECD 1404 may include an optical sensor 1702, an illumination source 1704, a display 1706, a keypad 1708, and a scanner 1710.

In some implementations, the optical sensor 1702 may be configured to capture still or moving images. For example, the optical sensor 1702 may capture the fingerprints, the iris patterns, the facial features, the signature patterns, the shapes of the ears, the retinal patterns, the gait, and/or the hand geometry of the requester 1450. In some examples, the optical sensor 1702 may be a broadband camera configured to detect electromagnetic radiation having wavelengths ranging from 200 nanometers (e.g., soft UV) to 2000 nanometers (e.g., near infra-red (NIR)). In a particular example, the optical sensor 1702 is configured to detect radiation between 700 to 900 nanometers. In certain implementations, the optical sensor 1702 may include a motion sensor configured to detect people approaching the ECD 1404.

In certain examples, the optical sensor 1702 may include a wide angle lens (e.g., such as a fisheye lens) used to provide both vertical area coverage to capture faces across the full range of human heights (as well as addressing American's With Disabilities Act requirements) and to provide horizontal coverage of the complete area of an access point to address more than one person accessing the secure area on one authentication. In other examples, the optical sensor 1702 may employ a high resolution (e.g., megapixel per square inch) charge coupled device (CCD) array. The high resolution array may provide the ability to identify faces at a greater distance from the sensor. The ECD 1404 may take advantage of the increased distance of identification to pre-identify requesters in queuing situations. Potential requesters may be identified as they enter a queuing area and a placed in a priority list to accelerate the confirmation at the access controlled entry point and discharge of the queue. The pre-identification and prioritizing of individuals in the identification process at the access point enables high volume throughput at the entry point by reducing the identification time during the identification and authentication process.

In certain implementations, the illumination source 1704 may emit electromagnetic radiation having wavelengths ranging from 200 nanometers to 2000 nanometers. In certain examples, the illumination source 1704 may emit non-visible radiation between 700 to 900 nanometers and/or 200-300 nanometers. The illumination source 1704 may emit radiation to illuminate bodily features and patterns of the requester 1450 used for biometric analysis (analyzing biometric template to determine access rights). The emitted radiation may impinge on a portion of a body of the requester 1450, and reflect off of the portion of the body. The reflected radiation may be captured by the optical sensor 1702 for biometric analysis.

In some implementations, the display 1706 may present useful information to the requester 1450. For example, the display 1706 may show one or more images of a face 1730 of the requester 1450, captured by the optical sensor 1702, to assist the requester 1450 in aligning the face 1730 during biometric analysis. In another example, the display 1706 may notify the requester 1450 a status of the entry point associated with the ECD 1404 (e.g., locked down, temporarily unavailable, normal operations, under maintenance). In yet another example, the display 1706 may display information such as time, date, weather, current location, etc.

Still referring to FIG. 17, the keypad 1708 may allow the requester 1450 to enter numbers, symbols, and alphabets into the ECD 1404. In an example, the requester 1450 may enter a password in addition to the biometric analysis to gain access to the entry point.

In some implementations, the scanner 1710 may be a radio frequency identification (RFID) scanner, a proximity card scanner (e.g., HID[4] card scanner), a contact card scanner, or a magnetic card scanner. In an example, the scanner 1710 may send an interrogatory signal to a proximity card (not shown) having a coil and an integrated circuit with a programmable or non-programmable identification sequence. The interrogatory signal may be "absorbed" by the coil and may energize the integrated circuit. In response, the energized integrated circuit sends a response signal including the identification sequence back to the scanner 1710 via the coil. The scanner 1710, in turn, analyzes the identification sequence to determine whether or not to grant access. The identification sequence may be one or more numbers, alphabets, symbols, and/or a combination thereof.

Still referring to FIG. 17, in an implementation, the requester 1450 may approach the ECD 1404 during operations. The optical sensor 1702 may detect the requester 1450. In response to the detection, the illumination source 1704 may emit incident NIR radiation 1760 toward the requester 1450. The incident NIR radiation 1760 may impinge on the face 1730 of the requester 1450, and reflect off of the face 1730 of the requester 1450. In some implementations, the optical sensor 1702 may detect detected NIR radiation 1762 originating from the surface of the face 1730. The detected NIR radiation 1762 may include reflected incident NIR radiation 1760 and/or NIR radiation emitted from the requestor 1450 due to thermal heating (i.e., black body radiation). The intensity and distribution of the detected NIR radiation 1762 may depend on the intensity and angle of the incident NIR radiation 1760, the contour of the face 1730, angle of detection by the optical sensor 1702, and other factors. The ECD 1404 may use the detected NIR radiation 1762 to construct a facial template (the "NIR sampled profile") of the requester 1450. The ECD 1404 may compare the constructed NIR sampled profile with existing templates stored therein (details described below). If the ECD 1404 detects a match, the ECD 1404 may allow the requester 1450 access to the entry point (as described above).

In some examples, a NIR sampled profile generated via NIR radiation detection may be resistant to changes in ambient lighting. As ambient lighting fluctuates (e.g., changes in luminance, color, color temperature, lighting angle), a NIR sampled profile constructed using NIR radiation detection may remain sufficiently constant to prevent a false acceptance or a false rejection. For example, the NIR sampled profile of the requester 1450 constructed via NIR radiation detection under a "bright" condition (e.g., 1000 lux) may be substantially identical to the NIR sampled profile constructed via NIR radiation detection under a "dark" condition (e.g., 100 lux). In another example, the NIR sampled profile of the requester 1450 constructed via NIR radiation detection under substantially blue light (e.g., CIE coordinates x=0.153, y=0.100) may be substantially identical to the NIR sampled profile constructed via NIR radiation detection under substantially white light (e.g., CIE coordinates x=0.30, y=0.33).

Still referring to FIGS. 14 and 17, in other implementations, a NIR sampled profile generated via NIR radiation detection may improve the privacy of the owner. For example, the storage device 1410 may store NIR sampled profiles of employees and associated confidential information (e.g., birthdates, email account passwords). If an unauthorized person gains access to the NIR sampled profiles and the associated confidential information, the unauthorized person may not be able to exploit the stolen confidential information because it may be difficult to identify the employees based on the NIR sampled profiles. Given that the NIR sampled profiles are constructed using, for example, detected NIR radiation, they may be unrecognizable because the NIR sampled profile of a person may be drastically different from the visual image of the face of the same person.

In another implementation, the requester 1450 may approach the ECD 1404 during operations. The optical sensor 1702 may detect the requester 1450. In response to the detection, the illumination source 1704 may emit incident UV radiation 1760 (e.g., electromagnetic radiations having wavelengths between 315-390 nanometers) toward the requester 1450. The incident UV radiation 1760 may impinge on the face 1730 of the requester 1450, and reflect off of the face 1730 of the requester 1450. In certain examples, the incident UV radiation 1760 may penetrate the surface of the face 1730 and reflect off of subdermal features of the face 1730 (e.g., dermis, subcutaneous tissue, muscles, imperfections). In some implementations, the optical sensor 1702 may detect detected UV radiation 1762 originating from the surface and/or subdermal features of the face 1730. The detected UV radiation 1762 may include reflected incident UV radiation 1760. The intensity and distribution of the detected UV radiation 1762 may depend on the intensity and angle of the incident UV radiation 1760, the contour of the face 1730, angle of detection by the optical sensor 1702, and other factors. The ECD 1404 may use the detected UV radiation 1762 to construct a facial template (the "UV sampled profile") of the requester 1450. The ECD 1404 may compare the constructed UV sampled profile with existing templates stored therein (details described below). If the ECD 1404 detects a match, the ECD 1404 may allow the requester 1450 access to the entry point (as described above).

In some examples, a UV sampled profile generated via UV radiation detection may be resistant to changes in ambient lighting. As ambient lighting fluctuates (e.g., changes in luminance, color, color temperature, lighting angle), a UV sampled profile constructed using UV radiation detection may remain sufficiently constant to prevent a false acceptance or a false rejection. For example, the UV sampled profile of the requester 1450 constructed via UV radiation detection under a "bright" condition (e.g., 1000 lux) may be substantially identical to the UV sampled profile constructed via UV radiation detection under a "dark" condition (e.g., 100 lux). In another example, the UV sampled profile of the requester 1450 constructed via UV radiation detection under substantially blue light (e.g., CIE coordinates x=0.153, y=0.100) may be substantially identical to the UV sampled profile constructed via NIR radiation detection under substantially white light (e.g., CIE coordinates x=0.30, y=0.33).

Still referring to FIGS. 14 and 17, in other implementations, a UV sampled profile generated via UV radiation detection may improve the privacy of the owner. For example, the storage device 1410 may store UV sampled profiles of employees and associated confidential information (e.g., birthdates, email account passwords). If an unauthorized person gains access to the UV sampled profiles and the associated confidential information, the unauthorized person may not be able to exploit the stolen confidential information because it may be difficult to identify the employees based on the UV sampled profiles. Given that the UV sampled profiles are constructed using, for example, detected UV radiation, they may be unrecognizable because the UV sampled profile of a person may be drastically different from the visual image of the face of the same person. A sampled profile may be a rendering of the dataset that visualizes the consistency of position within the three arrays. If the sampled profile is compromised, it may be more difficult to obtain biometric information used to identify the individual.

In some examples, the ECD 1404 may generate a visible-light sampled profile based on detected visible-light reflected from the face 1730 of the requester 1450.

In certain implementations, the requestor 1450 may be asked to provide a password, a personal identification number (PIN), and/or a valid HID' card to be used in conjunction with the constructed sampled profile to gain access to the entry point associated with the ECD 1404.

In other implementations, the ECD 1404 may include a microphone (not shown in FIG. 17) to perform voice recognition.

In some examples, the display 1706 may show the face 1730 of the requester 1450 as imaged by the optical sensor 1702. The display 1706 may include alignment marks (not shown) to assist the requester 1450 in aligning the face 1730 with respect to the optical sensor 1702. This alignment process may minimize false acceptances and false rejections due to misalignment. In certain implementations, the ECD 1404 may be a pocket-sized mobile device powered by rechargeable batteries.

Figure 18:
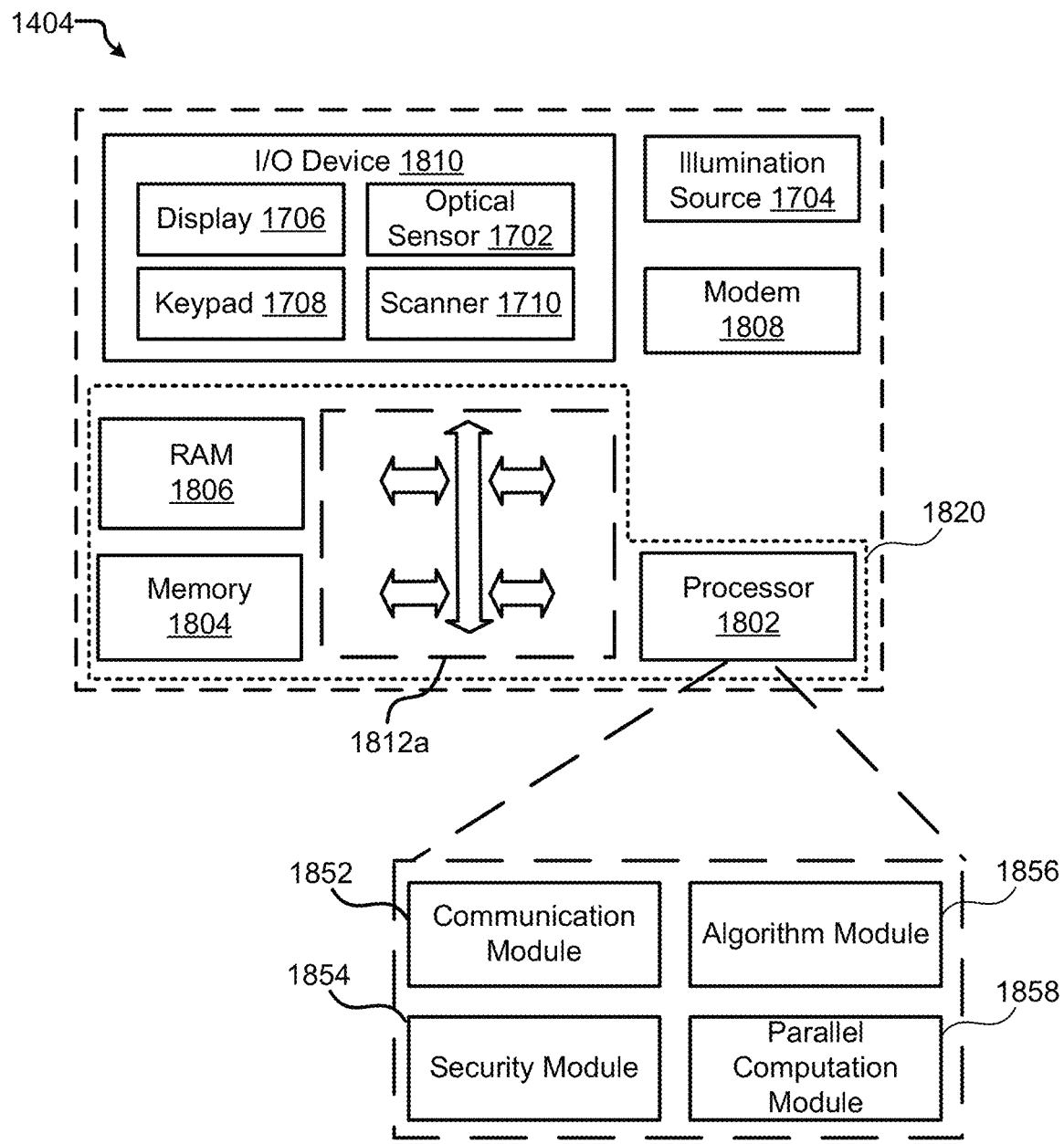
FIG. 18 illustrates an example of the components of the ECD of FIG. 17, in accordance with aspects of the present disclosure.

Referring to FIG. 18, in some implementations, the ECD 1404 may include a processor 1802 having a communication module 1852 configured to communicate with the gateways 1402 and other ECD ECDs 1404 as described in this disclosure. The communication module 1852 may be implemented as hardware in the processor 1802 for example, as software code executed by the processor 1802, or a combination thereof. The processor 1802 may also include a security module 1854 configured to encrypt and/or decrypt data. The security module 1854 may be implemented as hardware in the processor 1802 for example, as software code executed by the processor 1802, or a combination thereof. The processor 1802 further includes an algorithm module 1856 for constructing and comparing biometric templates as described throughout this disclosure. Alternatively, the communications with the Gateway may be facilitated by a processor in the control panel. The algorithm module 1856 may be implemented as hardware in the processor 1802 for example, as software code executed by the processor 1802, or a combination thereof. The processor 1802 may further include a parallel computation module 1858 for performing distributed processing. The parallel computation module 1858 may be implemented as hardware in the processor 1802 for example, as software code executed by the processor 1802, or a combination thereof. The processor 1802 may include one or more processors or cores, and may be implemented as a semiconductor processor, graphical processing unit, a field programmable gate array, a programmable logic device, a processing cluster, an application specific integrated circuit, or other suitable architectures.

The ECD 1404 includes a memory 1804. The memory may be static or dynamic memory such as flash memory, random access memory, magnetic memory, or semiconductor memory. The memory 1804 may include external memory such as a cloud storage. The memory 1804 may include or store applications and/or computer executable code. The ECD 1404 further includes a modem 1808 for communicating with the gateways 1402 and other ECD ECDs 1404, and may operate in cooperation with the communication module 1852. The ECD 1404 also includes a RAM 1806, such as static or dynamic random access memory (RAM). The ECD 1404 may also include an Input/Output (I/O) device 1810 communicatively coupled to the display 1706, the optical sensor 1702, the keypad 1708, and the scanner 1710. The components within the ECD 1404 may be interconnected by an internal bus 1812*a*. The processor 1802, the memory 1804, the RAM 1806, and the internal bus 1812*a* may be disposed on a processing board 1820.

Figure 19:
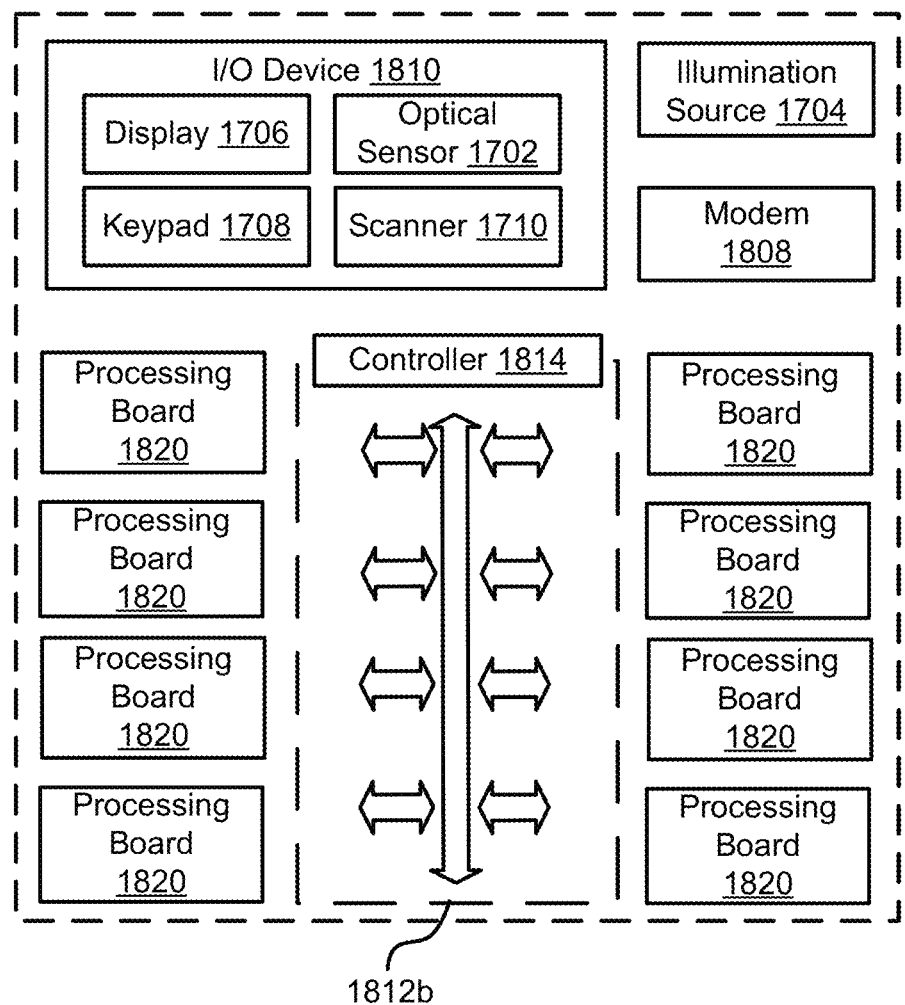
FIG. 19 illustrates another example of the components of the ECD of FIG. 17, in accordance with aspects of the present disclosure.

Referring now to FIG. 19, another example of the ECD 1404 may include a number of processing boards 1820 interconnected by an external bus 1812*b*. Each processing board 1820 may include the processor 1802, the memory 1804, the RAM 1806, and the internal bus 1812*a*. Data distributed among the processing boards 1820 may be distributed by a controller 1814 via the external bus 1812*b*. In a non-limiting example, the ECD 1404 may download (from the gateways 1402) 240,000 biometric templates of potential requestors. The controller 1814 may distribute the 240,000 biometric templates evenly or unevenly among the processing boards 1820 such that each processing board

1820 may store, in the respective memory 1804, 30,000 biometric templates. In some implementations, each processing board 1820 may store the same or different number of biometric templates.

Still referring to FIG. 19, in an example, during operations, the ECD 1404 may construct a sampled profile (e.g., UV or NIR) of the requestor 1450 based on the detected NIR radiation 1762. The controller 1814 may distribute copies of the constructed sampled profile to each of the processing boards 1820. In some implementations, the processing boards 1820 may simultaneously compare the duplicated sampled profiles with the locally stored biometric templates (e.g., 30,000 stored in each processing board 1820). While the current example of the ECD 1404 shown in FIG. 19 includes eight processing boards 1820, other numbers of processing boards 1820 may also be used. For example, the ECD 1404 may include 2, 4, 6, 8, 12, 16, 32 or 64 processing boards 1820.

In an implementation, the ECD 1404 may rely on remote processing boards (not shown) to perform the distributed computing described above. For example, the ECD 1404 may send the duplicated sampled profiles to the remote processing boards to jointly and simultaneously implement the algorithm (described below) for matching the duplicated sampled profiles (or the numerical representation of the duplicated sampled profiles) to known biometric templates. The processing boards may be within other ECD ECDs within the network. In certain examples, the ECD 1404 may send the duplicated sampled profiles to a Beowulf cluster. The clustering design may employ inter-process and inter-processor protocols to share processing tasks of the same application between both processors and the processing cores within those processors. In the case of facial recognition, processor-intensive operations like facial verification may utilize multiple processors or multiple cores to complete the operation within an acceptable period of time. In some cases, large multi-core processors may be used for this type of operation. In other cases, the operation may be spread across several advanced RIISC machine ("ARM") processors to accomplish the same performance as the single multi-core processor without the high hardware cost and potential for a single point of failure.

Referring back to FIG. 14, in a non-limiting example of distributed parallel comparison, the first gateway 1402a may download 600,000 biometric templates of potential requesters (e.g., employees and contractors) from the enterprise server 1406b. The first gateway 1402a may distribute 100,000 biometric templates to each of the ECD-e 1404e and the ECD-f 1404f, and 200,000 biometric templates to each of the second gateway 1402b and the third gateway 1402c. Next, the second gateway 1402b may distribute 100,000 biometric templates to each of the ECD-c 1404c and the ECD-d 1404d, and the third gateway 1402c may distribute 100,000 biometric templates to each of the ECD-a 1404a and the ECD-b 1404b. Consequently, the 600,000 biometric templates downloaded from the enterprise server 1406b may be evenly distributed among the ECD ECDs 1404 (i.e., 100,000 non-overlapping templates each). In some implementations, when the ECD-b 1404b constructs a sampled profile (UV or NIR) of the first requester 1450a, the ECD-b 1404b may duplicate the constructed sampled profile and distribute the duplicated sampled profiles to the ECD-a 1404a, ECD-c 1404c, ECD-d 1404d, ECD-e 1404e, and ECD-f 1404f (via one or more gateways 1402). The ECD ECDs 1404 may compare the duplicated sampled profile of the first requester 1450a with the 100,000 templates stored locally to determine a match. The ECD-a 1404a, ECD-c 1404c, ECD-d 1404d, ECD-e 1404e, and ECD-f 1404f may send (via one or more gateways 1402) the result of the comparison back to the ECD-b 1404b. The ECD-b 1404b may gather the results and determine whether to grant access to the first requester 1450a. In other implementations, the biometric templates may be unevenly distributed among the ECD ECDs 1404.

Figure 20:
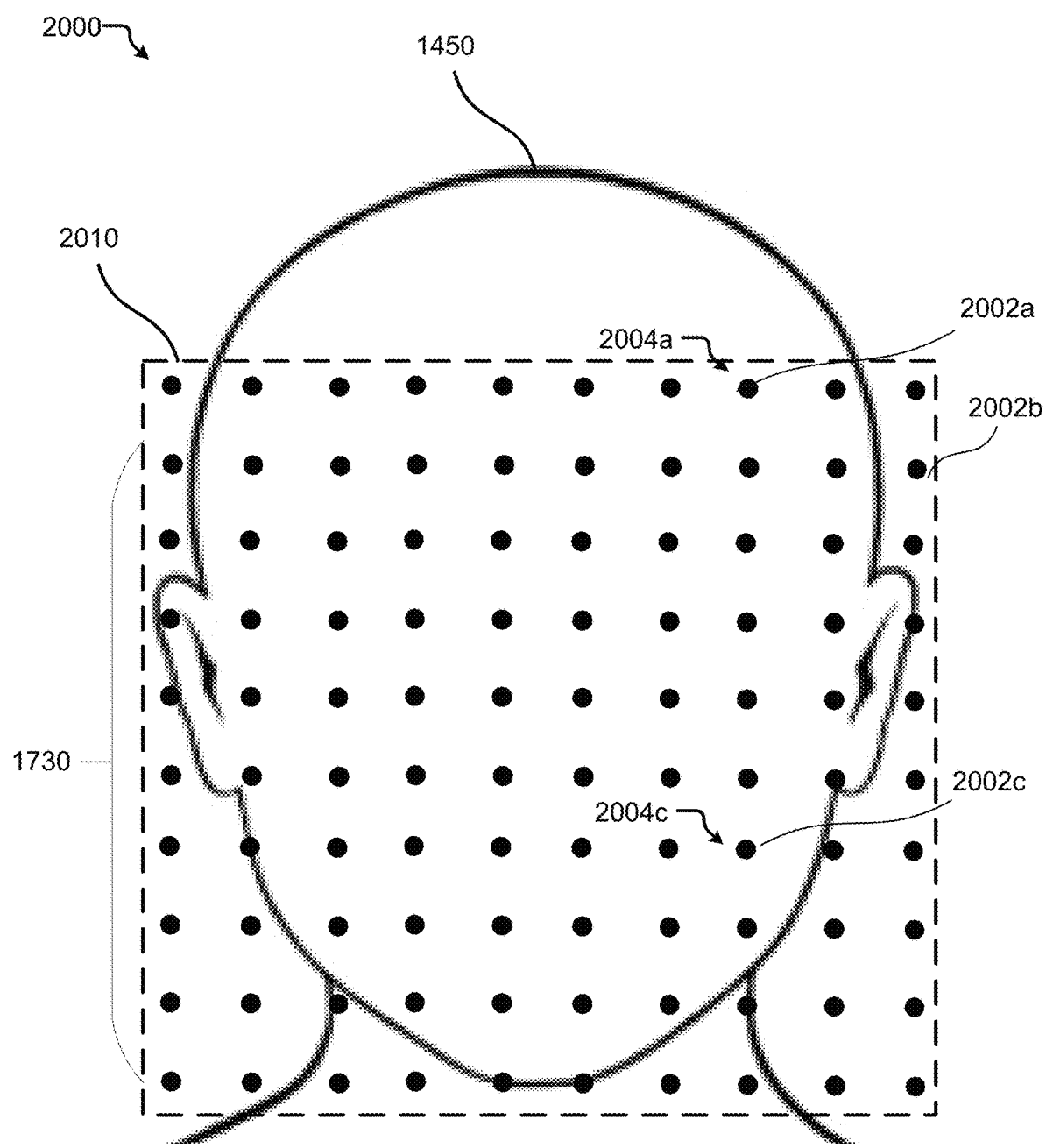
FIG. 20 illustrates an example of a sampled profile, in accordance with aspects of the present disclosure.

Referring now to FIG. 20, the ECD 1404 may generate a sampled profile 2000 based on measuring the intensity of the detected radiation 1762 from the face 1730 of the requester 1450. The sampled profile 2000 may include a base matrix 2010 of one or more measurement points 2002. The measurement points 2002 may include a value indicative of the intensity of the detected radiation 1762 at a location of the particular measurement point. For example, the measurement point-a 2002a may indicate an intensity scale value of 2 corresponding to a region 2004a (e.g., black hair) around the face 1730 of the requester 1450. The measurement point-b 2002b may indicate an intensity scale value of 50 that corresponds to a background color. The measurement point-c 2002c may indicate an intensity scale value of 21 that corresponds to a region 2004c (e.g., cheeks) on the face 1730 of the requester 1450. In certain examples, the intensity scale may range from 0 (no reflection) to 100 (maximum reflection able to be detected by the optical sensor 1702 of the ECD 1404. In an implementation, the intensity scale may measure an absolute intensity (e.g., brightness) of the measurement points 2002. In other examples, the sampled profile 2000 may include measurement points 2002 for detected radiation 1762 of different wavelengths (e.g., UV, NIR, red, green, blue).

While the sampled profile 2000 in FIG. 20 shows the base matrix 2010 of 10×12 measurement points 2002 across the face 1730 of the requester 1450, other measurement points density may be possible for the base matrix 2010. For example, the ECD 1404 may generate another sampled profile using 100×100 measurement points across the face 1730 of the requester 1450. In another example, the ECD 1404 may generate a sampled profile using 500×500 measurement points. Other measurement points density are also possible, and may depend on desired accuracy, computational constraints, amount of data storage, etc.

In some implementations, the ECD 1404 may remove measurement points 2002 indicating the background.

Figure 21:
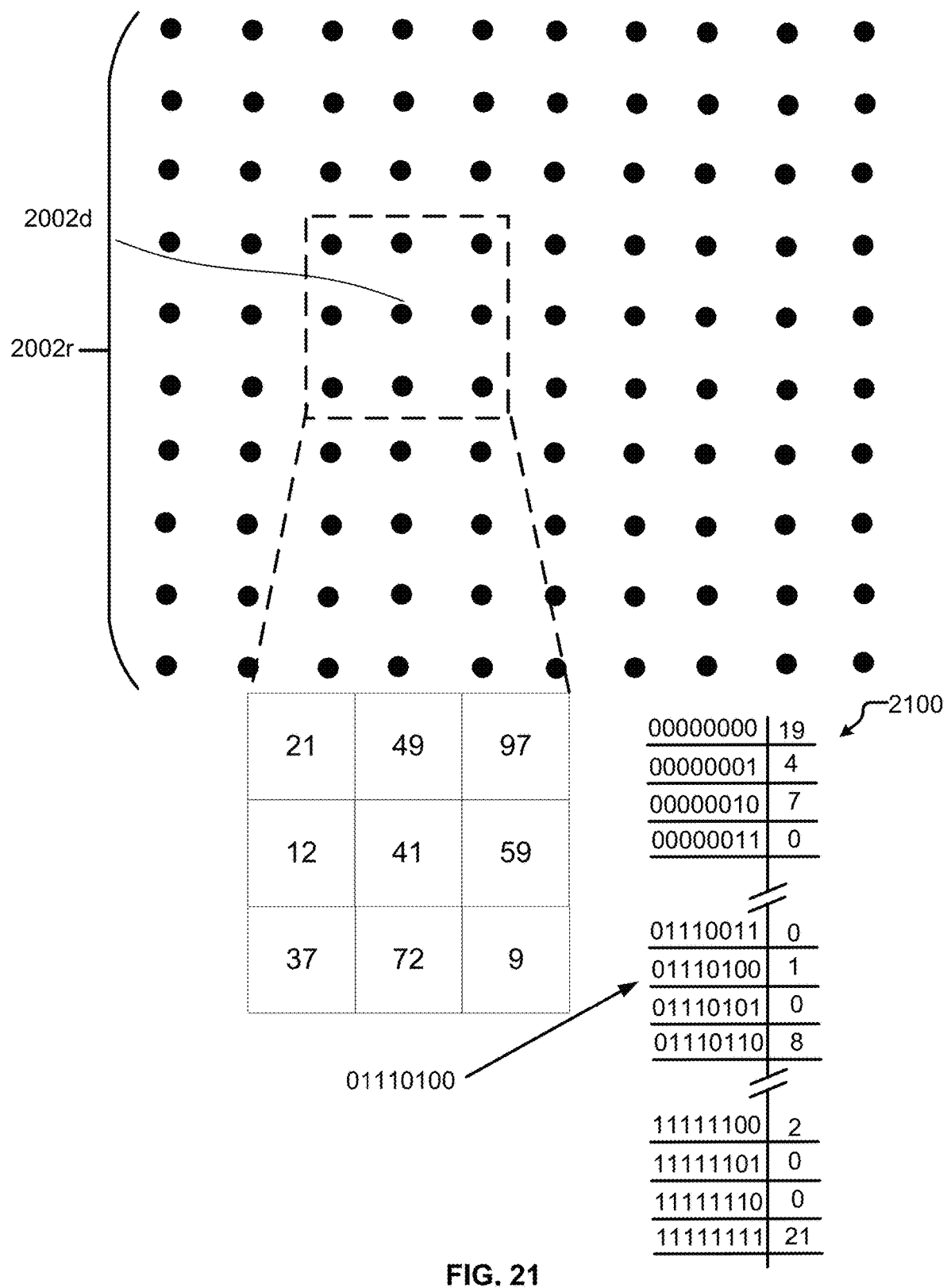
FIG. 21 illustrates an example of LBP operation on measurement points of the sampled profile of FIG. 20, in accordance with aspects of the present disclosure.

Turning now to FIG. 21, in one implementation, the ECD 1404 (or the processor 1802) may apply the LBP operation to one or more of the measurement points 2002 within the base matrix 2010. For example, the ECD 1404 may perform LBP on the measurement point-d 2002d, which includes an intensity value of 41. The LBP string for the measurement point-d 2002d is 01110100, based on the span of 1 (i.e., performing LBP using the immediate neighbors, having distance of 1 cell, of the measurement point-d 2002). The ECD 1404 may track the numbers of LBP strings for the remaining measurement points 2002r as shown in a table 2100. In some examples, the ECD 1404 may compute 24 of the measurement points 2002 as having the LBP string of 00000000, 3 having the LBP string of 00000001, 11 having the LBP string of 00000010, and 0 having the LBP string of 00000011, etc., as indicated in a table 2100. The table 2100 may include 256 entries for the possible strings (i.e., 8 bits). In some examples, the table 2100 may include 255 entries by eliminating the entry for the "all white" string (11111111) or the "all black" string (00000000). In some implementations, the data in the table 2100 may be plotted as a histogram indicating the number of occurrences (e.g., measurement points 2002) for the possible LBP strings.

In some implementations, based on the distribution of the LBP strings in the table 2100, the ECD 1404 may determine one or more unique features. The one or more unique features may be non-zero LBP strings occurring fewer than a threshold frequency (e.g., 5), such as LBP strings 00000001, 01110100, and 11111100. In another implementations, the one or more unique features may be the non-zero LBP strings occurring the least, such as LBP strings 01110100. In some examples, the ECD 1404 may track the location the measurement points 2002 having the one or more unique features. For example, the ECD 1404 may track the coordinate of the LBP strings. In some implementations, the one or more unique features may be the non-zero LBP strings occurring the most.

Figure 22:
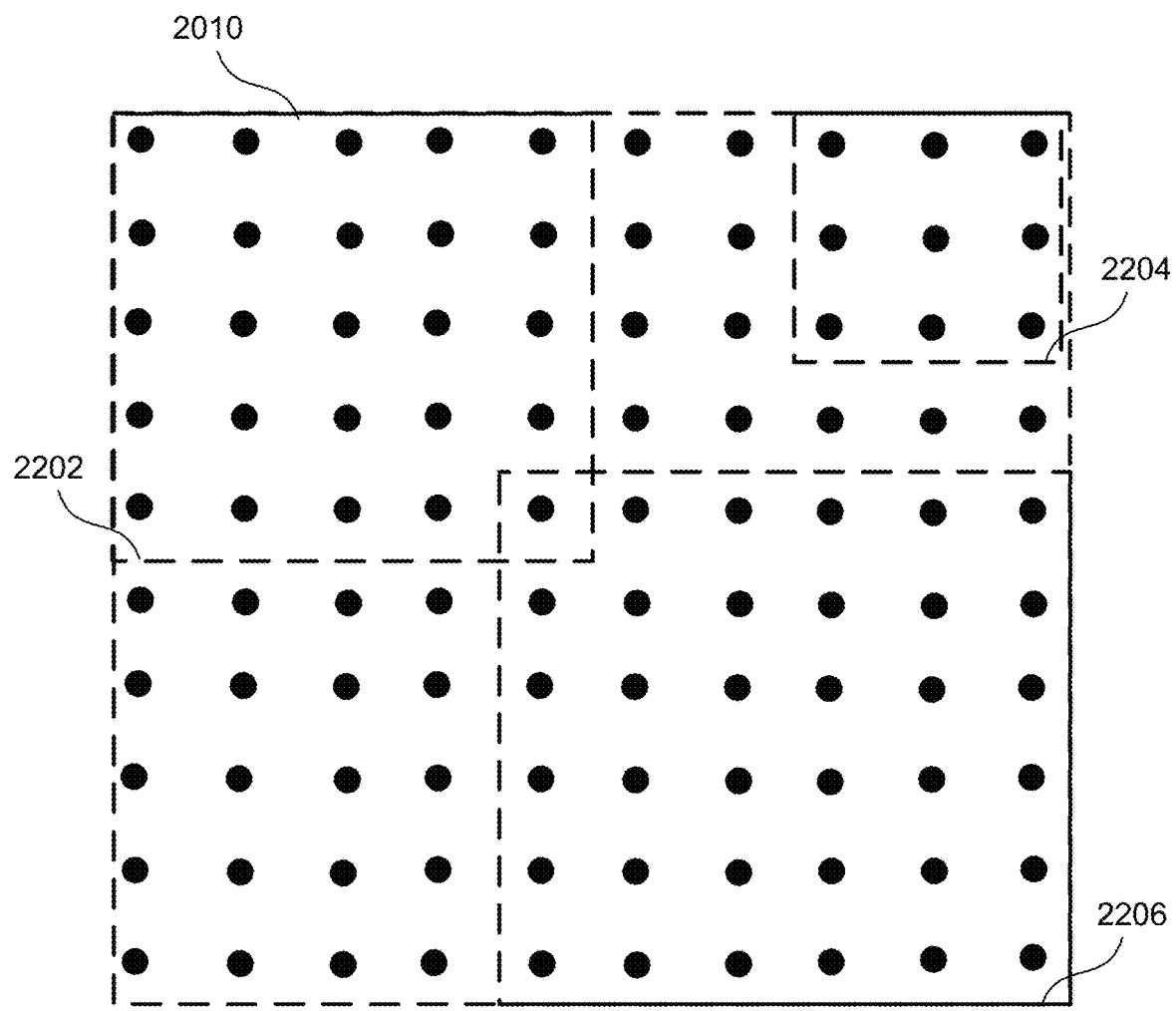
FIG. 22 illustrates examples of sub-matrices.

Turning now FIG. 22, in certain implementations, the ECD 1404 may divide the base matrix 2010 into one or more sub-matrices. Each sub-matrix may include a macroblock of measurement points. For example, the ECD 1404 may divide the base matrix 2010 into a 5×5 sub-matrix 2202, a 3×3 sub-matrix 2204, and a 6×6 sub-matrix 2206. When computing the LBP strings for the measurement points 2002 within the 5×5 sub-matrix 2202, the ECD 1402 may calculate the LBP strings of the measurement points 2002 within the 5×5 sub-matrix 2202 using a span of 3 (i.e., calculating LBP strings using neighbors 3 cells away). Similarly, when computing the LBP strings for the measurement points 2002 within the 3×3 sub-matrix 2204, the ECD 1402 may calculate the LBP strings of the measurement points 2002 within the 3×3 sub-matrix 2204 using a span of 2. When computing the LBP strings for the measurement points 2002 within the 6×6 sub-matrix 2206, the ECD 1402 may calculate the LBP strings of the measurement points 2002 within the 6×6 sub-matrix 2206 using a span of 4. Other sizes for the base matrix, the sub-matrices, and spans are possible, as determined by the ECD 1402.

In one example, a 100×100 base matrix may be divided into sub-matrices of six different sizes: 10×10, 15×15, 20×20, 30×30, 35×35 and 40×40. Within each of these sub-matrices, the LBP string may be calculated with a different span around the measurement point being calculated to characterize the texture/slope of the area surrounding the cell at different coverage areas. The span in pixels from the measurement point 2002 to be calculated to each of the neighboring cells for each of the sub-matrix sizes may be 3, 9, 15, 21, 27 and 33. In another example, a 200×200 base matrix may include 6 different sub-matrices having sizes of 10×10, 20×20, 35×35, 50×50, 65×65, 80×80, and 100×100. The span in pixels from the measurement point 2002 to be calculated to each of the neighboring cells for each of the sub-matrix sizes may be 3, 5, 7, 10, 25 and 40. The sub-matrices may overlap in some instances. In certain implementations, the ECD 1404 may apply LTP computations onto the measurement points 2002.

Referring now to FIG. 23, in certain examples, the ECD 1404 may convert the list of binary features derived from the sampled profile into a data sequence that is extensible and capable of being tailored to the unique traits of each requester 1450 while still providing a methodology of object comparison and matching/verification. A binary feature may contain three characteristics: the size of the sub-matrix/macroblock, the location of the sub-matrix/macroblock on the sampled profile, and the Uniform Local Binary Pattern (ULBP) assigned to binary feature. A macroblock may be a "sub-image" of the image of the face 1730 of the requester 1450. For instance, a macroblock of size 10 is a 10×10 (i.e., 100 measurement points 2002) sub-image of the image of the face 1730. In a non-limiting example, the location of the macroblock on the image may be defined by the position of the first pixel in the macroblock located in the top, left corner of the macroblock. The position of this pixel is defined by two values, its distance from the left boundary of the face image (x-dimension) and the distance from the top boundary of the face image (y-dimension). The final characteristic is the ULBP, which is a mathematical methodology for establishing a scalar value for the edge and texture characteristics of a pixel starting with the top left of the face 1730. For each pixel within the macroblock, a ULBP calculation is performed. If the calculated ULBP matches the defined ULBP for that binary feature, the value of the binary feature is incremented by one. Therefore, the maximum value of a binary feature is the size of the defined macroblock (10×10 is 100) and the minimum value is zero. A macroblock may be used in more than one binary feature with a different ULBP definitions. The location of a macroblock may also be used in more than one binary feature with a different macroblock size and ULBP definition.

Still referring to FIG. 23, a table 2300 may illustrate an example of the results of the sequence conversion process for macroblocks having sizes of 10×10, 35×35, 20×20, 30×30, 15×15, 40×40, and 15×15. Three arrays may be used to generate a biometric template. First array may be a scalar value in array normalized. Second array may be sorted so that binary feature 2000, which in this example has the highest value, goes to the top of the second array in position 1. Third array compares the difference in the position of binary feature 2000 in the sort instead of scalar value. If the position within the array for binary feature 2000 remains the same, the results will reflect a value of 0 representing the least possible change in position and therefore the highest value for significance in the authentication method.

Figure 24:
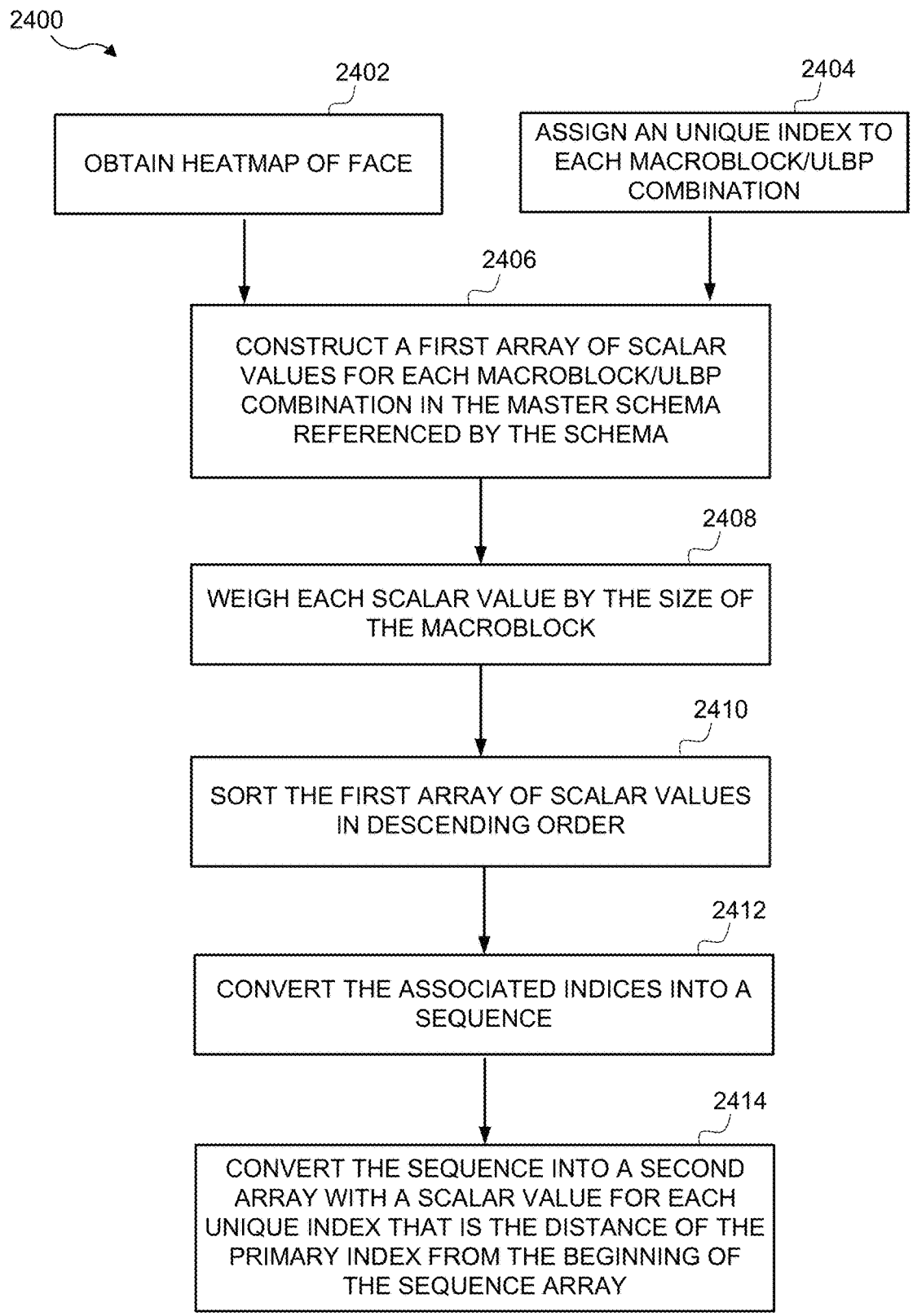
FIG. 24 illustrates an example of a flow chart for converting a sequence, in accordance with aspects of the present disclosure.

Turning now to FIG. 24, a method 2400 of converting a sequence may identify the most unique features used for identification.

At block 2402, obtain the sampled profile of the face. For example, the processor 1802 and/or the communication module 1825 may obtain the sampled profile of the face 1730.

At block 2404, assign a unique index to each macroblock/ULBP combination. For example, the algorithm module 1856 may assign a unique index (e.g., 4) to each macroblock/ULBP combination (e.g., macroblock 30×30) and analyzing based upon uniqueness of traits within the face and not on scalar values.

At block 2406, construct a first array of scalar values for each macroblock/ULBP combination in the master schema referenced by the schema. For example, the algorithm module 1856 may construct a first array of scalar values for each macroblock/ULBP combination in the master schema referenced by the schema. First array includes number of pixels that fall within that ULBP within that macro-block. When analyzing the LBP of a pixel, the ECD 1404 may perform normal LBP calculation and get a histogram that is the value from 0-255, and if the result is the highest value (standard LBP formula that takes pixel and takes 8 pixels around it and then each pixel has a different binary value) then the result receives a value of 1. If some other LBP is higher than that pixel has a 0 value.

At block 2408, weigh each scalar value by the size of the macroblock. For example, the algorithm module 1856 may weigh each scalar value (e.g., 380) by the size of the macroblock (e.g., 30×30).

At block 2410, sort the first array of scalar values in descending order. For example, the algorithm module 1856 may sort the elements of the first array of scalar values in descending order from, for example, 1 to 2165.

At block 2412, convert the associated indices into a sequence. For example, the algorithm module 1856 may convert the associated indices into a sequence or the sort order of the data set instead of the scalar value.

At block 2414, convert the sequence into a second array with a scalar value for each unique index that is the distance (difference in position in array rather than measurement in mm) of the primary index from the beginning of the sequence array. For example, the algorithm module 1856 may convert the sequence into a second array with a scalar value for each unique index that is the position of the primary index from the beginning of the sequence array with 2165 elements currently but may be extensible depending upon data for each individual.

Figure 25:
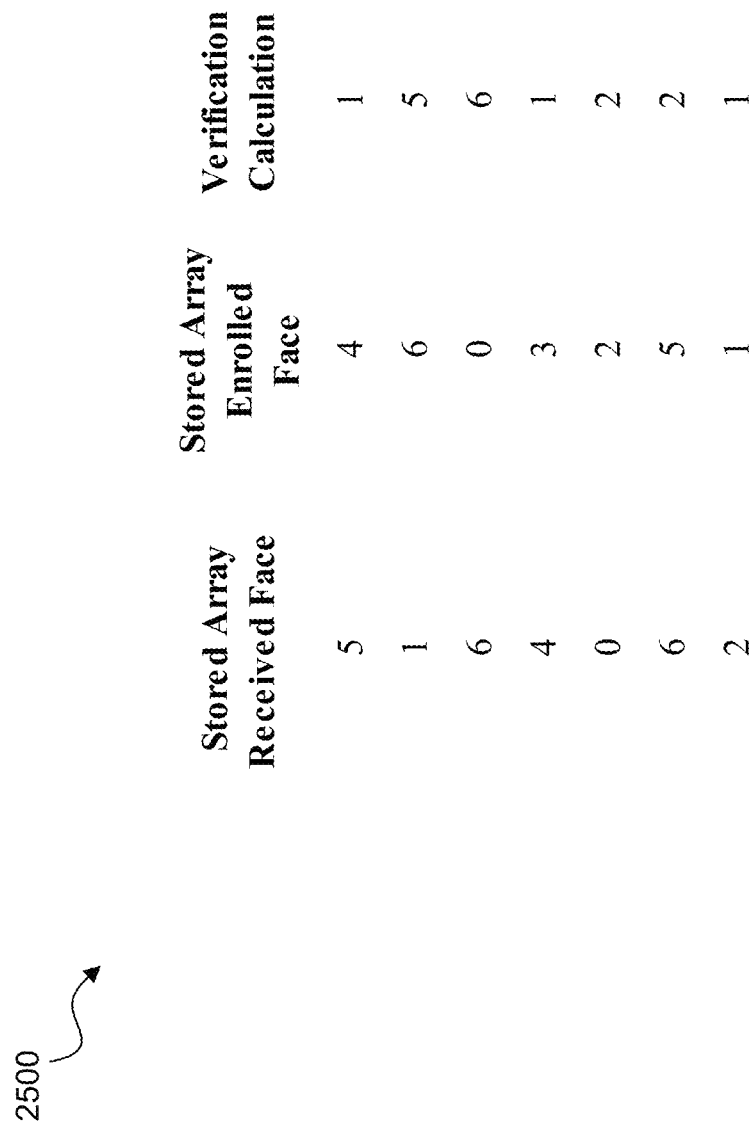
FIG. 25 illustrates an example of a table of verification calculations, in accordance with aspects of the present disclosure.

Referring to FIG. 25, in certain implementations, a deep learning may be performed on the full data set to establish the minimum data set required to accurately perform facial recognition. The result of the deep learning may be a reduced data set of binary features that is a fraction of the total data set (e.g., 1%, 2%, 5%, 10%, 20%, 50%). Each element of data in this data set may be defined by a sub-matrix of a specific size and location and a single value within the full LBP base matrix. Each data element may be assigned a unique numeric identifier. For the enrollment process, this static data set is used for each requester. As each requester continues to verify their faces, the verification data may be collected and through deep learning a new set of binary features may be created for each requester. The introduction of the sequence to the verification algorithm may allow the introduction of this individualized set of binary features and still allow for comparison between different sets. The matching of two sequences may be achieved by calculating the difference (e.g., the difference in position of a data set) of the two arrays. The greater the sum the lower the quality of the match. A perfect object match may have a sum of substantially zero.

Still referring to FIG. 25, a table 2500 illustrates an example of the verification calculations. The first step in creating the sequence may be the sorting of the scalar array by the magnitude of the scalar value. The sort may be performed in descending order. The binary feature unique identification with the largest value is at the top of the sort. By sorting in this manner, the binary features providing with the most uniqueness (greatest scalar magnitude) are at the top of the array. After the sort, the new sort position is transferred to that third array and the location on the new array is based upon the binary feature unique identification. Binary feature unique identifier is 2000 when it gets sorted it goes to position 1. In third array the 2000 position will receive a value of 1. This array may be a unique sequence for the object and is the new basis for object verification and/or matching.

The sequence matching algorithm determines the quality of the match by the distance of each binary feature unique identification from the beginning of the sequence. The distance is the index value of the binary feature unique identification within the sequence array where the index values are sequentially assigned. To efficiently complete this matching calculation, another array is created that contains the distance of each binary feature from the beginning of the sequence. As an example, after the sort, the binary feature with the unique identification of one is in position ten of the sorted sequence. In the new array, which is zero-indexed, position one will have a value of ten. By structuring the array in this manner, the algorithm to perform a match between two of these arrays is the same as the original algorithm. The absolute value of the difference of the values with the matching index is aggregated to create a single value for the array match. A lower value equates to a closer match. A perfect match may be substantially a zero value.

By introducing the sequence array, the matching algorithm may be extensible. Sequence array is second array and scalar array is the first array (normalized for block size). Extensible may indicate that the fixed list of binary features may now be expanded and contracted as required to optimize the process of matching objects while also improving the matching process integrity. In this implementation, the sequence array may be dynamically adjustable based on two separate deep learning functions based upon the environment of the edge device and the specific individual face being authorized. The first function may seek to continuously optimize the default list of binary features applied to some or all object matching attempts prior to the development of an individual list of binary features. The second function may aggregate image data on individual objects and over time develop an optimized list of binary features for the face. Once the individualized list of binary features exceeds the matching performance of the default list of binary features through parallel object matching trials on incoming object image data, the default list of binary features may be replaced with the individualized list of binary features for that object in the live object matching functions.

In certain implementations, the deep learning engine for both processes may receive sample data in parallel with the live object/face matching functions. As image data is received, two lists of binary features may be applied to it. The first list may either be the default or individualized list of reduced binary features. (e.g., three most important blocks out of 100 in 10×10 macroblock). The output of the application of this list may be used in the live matching process. The second list may be the full list of binary features, which comprises all possible macroblock size (e.g., all 100 within the 10×10 macroblock), applied to possible image positions for each ULBP. The complete list of binary features may be, for example, twenty times the size of the default or individualized list of binary features. The deep learning engine may receive a sequence derived from the complete list of binary features for each object image received into the system. In the case of the default list of binary features deep learning process, the images may be categorized into the training and validating sets. An independent default test set may be created including objects different than the object being learned. In the case of the individualized list of binary features, each object identified by the default or existing individualized list of binary features will be placed in the training, validation and test sets. All other object's list may be placed in the verification and test sets.

A deep learning training session for both the default object list of binary features and for each individual list of binary features may be executed for each new live entry from the object detection system.

Once the eyes detection algorithm locates the eyes, the face matrix of data is transferred to the facial recognition algorithm. If the deep learning algorithm has developed specific list of binary features, then an aggregate list of these binary features for all users in the system may be created and used to generate the sequence. Otherwise, the sequence may be generated using the default set of binary features. The sequence may be transferred to the verification algorithm where the matching process may determine the identity of the sequence. With the identity established, a full list of binary features (all sub-matrices with full LBP histograms) may be generated and transferred to that identities data set in the deep learning algorithm. The deep learning algorithm may process the available data set for that identity (the set may continue to grow with each verification) and generate a revised optimum data set for that identity. The optimized data set may be converted to a sequence and used in the next verification process for that user. At the same time the aggregate set of binary features may be updated if necessary for converting the next face matrix. While the verification process will be within the locale cluster of devices, the deep learning algorithm may occur within both the locale and global clusters as a background task.

As the results of the training session refine the list of binary features, the respective list may be updated in the live verification/matching process. The result may be a matching system capable of automatically adjusting to both the overall object population and the specific, unique traits of each object. The evolution of the object data will allow for large scale object matching solutions in excess of 100,000 objects capable of the same precision as a small solution (<1,000).

Figure 26:
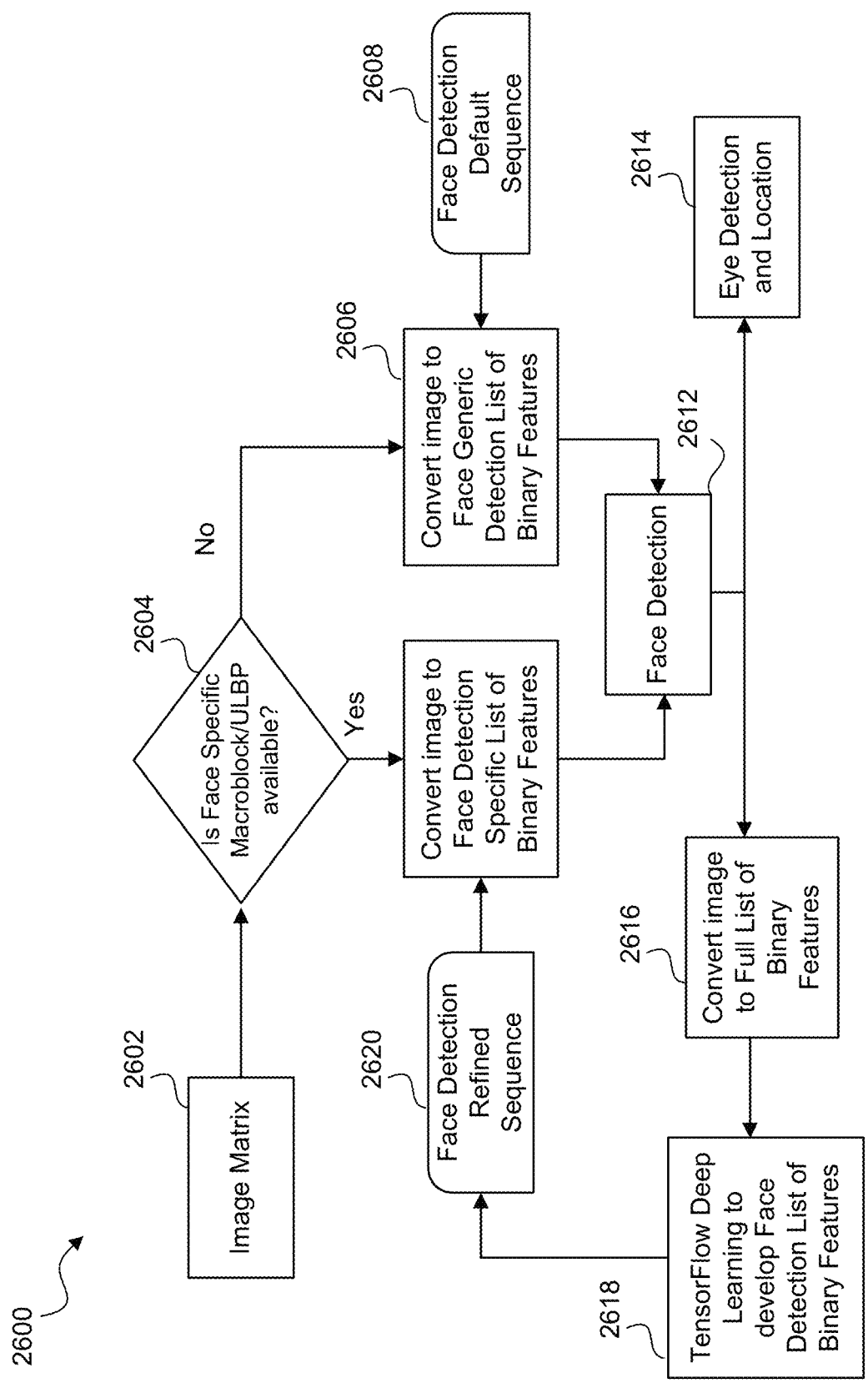
FIG. 26 illustrates an example of deep learning.

Referring now to FIG. 26, an example of the deep learning process 2600 may rely on feedback loops and machine learning to refine the identification process.

At block 2602, obtain an image matrix. For example, the processor 1802 and/or the communication module 1825 may obtain the sampled profile of the face 1730.

At block 2604, determine if the face specific macroblock/ULBP is available. For example, the algorithm module 1856 may determine if the face specific macroblock/ULBP is available.

At block 2606, if the custom list of binary features is not available, convert image to face generic detection list of binary features. For example, the algorithm module 1856 may convert image to face generic/default detection list of binary features if the custom list is not available.

At block 2608, obtain face detection default sequence. For example, the algorithm module 1856 may obtain face detection default sequence if the macroblock is not available.

At block 2610, if the custom list of binary features is available, convert image to face detection specific list of binary features. For example, the algorithm module 1856 may convert image to face detection specific list of binary features if the custom list of binary features (could be in original 2165 or could be all new ones that based upon that individual (e.g., 10 additional 10×10 s that are more distinctive for that particular individual) is available.

At block 2612, perform face detection. For example, the algorithm module 1856 may perform face detection.

At block 2614, perform eye detection and location. For example, the algorithm module 1856 may perform eye detection and location.

At block 2616, convert image to full list of binary features. For example, the algorithm module 1856 may convert image to full list of binary features. (not just 57, but all 100 of 10×10 of macroblocks and include all values). Tensor flow is the deep learning engine framework provided by Google™. Equation and algorithm for tensor flow is well known in the art.

At block 2618, develop face detection list of binary features using tensor flow deep learning. For example, the algorithm module 1856 may develop face detection list of binary features using tensor flow deep learning.

At block 2620, feedback face detection refined sequence. For example, the algorithm module 1856 may feedback face detection refined sequence. To refine the list of features, the ECD 1404 may take entire feature set and collect all data for face and derive a new refined set that replaces the default set. Distance calculation between the position of the binary feature within two sets may be used as metrics. Every feature would be in the same position every time. As face data get better face to face comparison will get smaller and the difference between this face and all others will get larger.

Figure 27:
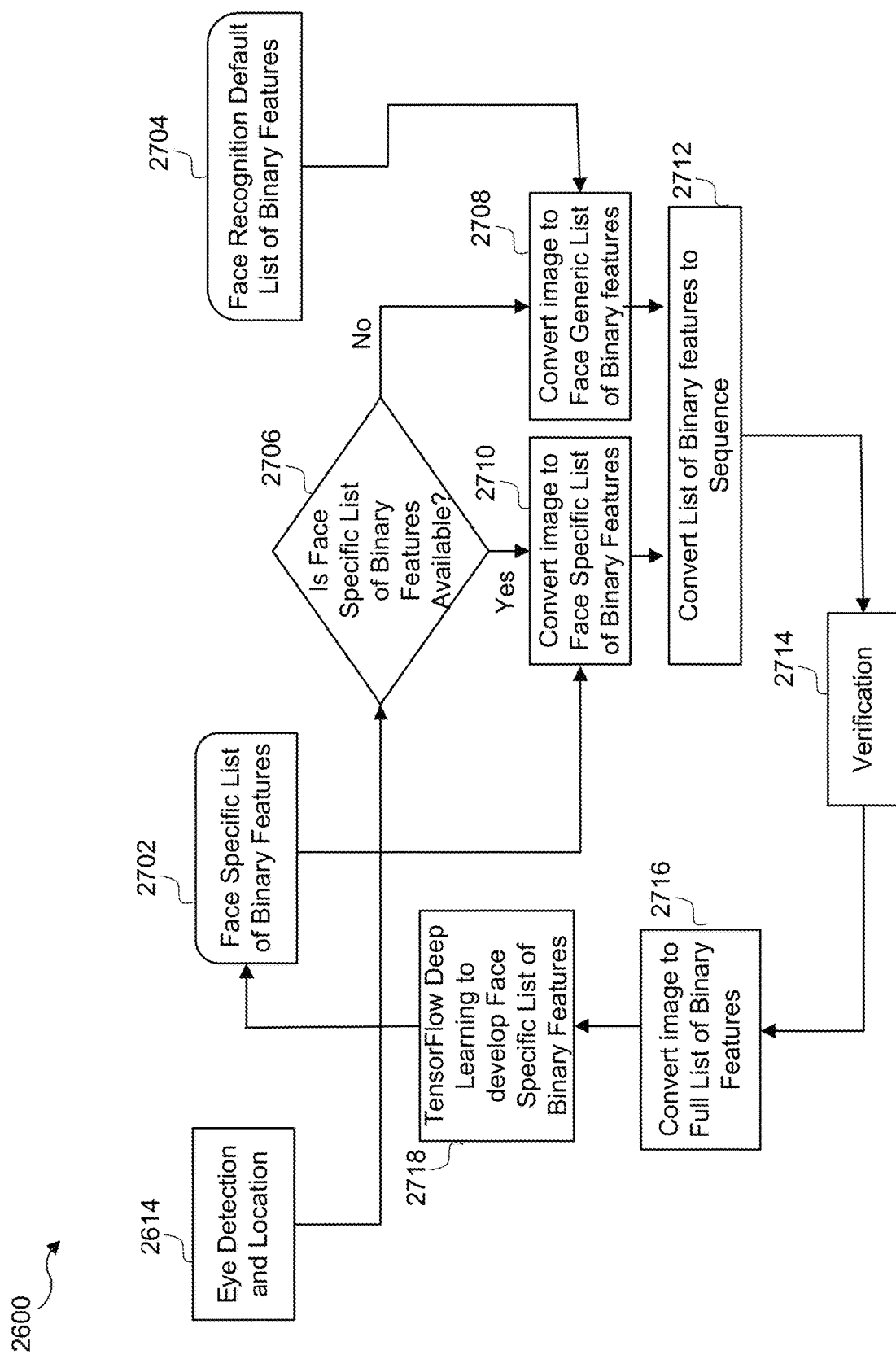
FIG. 27 illustrates another example of deep learning.

Turning now to FIG. 27, the example of the deep learning process 2600 shown in FIG. 26 may rely on feedback loops and machine learning to refine the identification process. Rather than centralizing process of deep learning data that is subject to hacking if stored in a central server (tensor flow single application operating on a single central server) particularly on the cloud, the present disclosure may use tensor flow in a distributed architecture to evaluate at each reader that is privacy protected on all individual devices rather than stored in one central server.

At block 2614, perform eye detection and location. For example, the algorithm module 1856 may perform eye detection and location.

At block 2702, obtain face detection specific list of binary features. For example, the algorithm module 1856 may obtain face detection specific list of binary features if the macroblock is available.

At block 2704, obtain facial recognition default list of binary features. For example, the algorithm module 1856 may convert image to face generic detection list of binary features if the specific list of binary features for that individual is not available.

At block 2706, determine if the face specific list of binary features is available. For example, the algorithm module 1856 may determine if the face specific list of binary features is available. Custom list of binary features may include the original 2165 or could be all new ones that are based upon that individual (e.g., 10 additional 10×10 s that are more distinctive for that particular individual).

At block 2708, if the face specific list of binary features is not available, convert image to face generic list of binary features. For example, the algorithm module 1856 may convert image to face generic list of binary features if the face specific list of binary features is not available.

At block 2710, if the face specific list of binary features is available, convert image to face specific list of binary features. For example, the algorithm module 1856 may convert image to face specific list of binary features if the face specific list of binary features is available.

At block 2712, convert list of binary features to sequences. For example, the algorithm module 1856 may convert list of binary features to sequences.

At block 2714, perform verification. For example, the algorithm module 1856 may perform verification.

At block 2716, convert image to full list of binary features. For example, the algorithm module 1856 may convert image to full list of binary features.

At block 2718, develop face specific list of binary features using tensor flow deep learning. For example, the algorithm module 1856 may develop face specific list of binary features using tensor flow deep learning. (not just 57 as is typical with LBP, but all 100 of 10×10 of macroblocks and include all values). Tensor flow is the deep learning engine framework provided by Google™. Equation and algorithm for tensor flow is well known in the art.

In some examples, the gateway 1402 and/or the ECD 1404 may include proactive algorithms to identify and reduce "consistency-collisions" during the verification process. A "consistency-collisions" may occur when one or more requesters have unique facial data that causes a mistake (i.e., false acceptance or false reject) in the verification.

The gateway 1402 and/or the ECD 1404 may seek out potential 'consistency-collisions' proactively using two methods of the present disclosure described below.

The 'Layered Reinforcement' algorithm may allow the requester to create a binary tree structure for the facial data. The binary data may create a hierarchy of data points (e.g., LBP string) based on the uniqueness of the data points. The greater the uniqueness the higher up on the tree. Every verification transaction may result in the transfer of the binary facial data from the ECD 1404 to the gateway 1402. When the gateway 1402 receives the binary facial data, it may begin checking the uniqueness of the new data's binary tree structure against the data of the other requesters 1450 stored. When it identifies a potential collision, the gateway 1402 may notify the ECD 1404 to escalate verification transactions between the two identified requesters 1450 to the gateway 1404. When the gateway 1404 receives an escalated transaction it may perform two advanced algorithms (i.e., the Proactive Collision Identification Algorithm and the Time-Domain Trending Algorithm) on the data. Binary tree may take most distinctive features and establish hierarchy based upon most and least distinctive. Prioritized tree may reduced analysis based on 20 rather than 2165 saving time and computing/processing. Based upon the branches of the tree off the most distinctive features may allow the ECD 1404 to determine if this is or is not the person rather than going thru all 2165 features. Thresholds may be empirical and derived from testing.

The first advanced algorithm, the Proactive Collision Identification Algorithm, may take the binary tree data and analyze the facial data based on its location in the binary tree. The binary tree data may be weighted. If the weighting of the binary data does not yield a sufficient differentiation of the data, the gateway 1402 may extend the verification process to find adequate differentiation data.

In some implementations, the facial characteristics of requesters may continuously change. If the biometric data of a face, such as the face 1730 of the requester 1450, remains static, the identification of the face may ultimately result in false rejections, requiring the re-enrollment of the face 1730. Dynamic adjustments to the biometric data may be continuously applied and algorithms may determine whether the proposed change is not the introduction of a different face into the biometric data resulting in a false acceptance on the face 17303. With every iteration of the biometric data, the algorithm must determine the amount of biometric data to retain to insure the next successful identification of the requester 1450 and the amount to change to insure the long-term identification of the requester 1450. The determination may be made by a combination of a time-domain analysis where the changes are regressed to insure linearity and facial regional analysis to determine if the area of change is rational.

The use of this dynamic data capability leads to the second algorithm, the Time-Domain Trending Algorithm. The gateway 1402 may maintain the history of the binary data of the requester 1450 and perform a time-domain based analysis of the data to assess what features are changing when the history of the binary data of requester 1450 is compared with face 1730 and the speed with which these features are changing. The gateway 1402 may track the evolution of the face and uses this data to extrapolate and reinforce the unique differences identified in the face 1730 of the requester 1450 to establish and later emphasize core features or baseline features and assess the rate of change in these core features for the face 1730. The gateway 1402 then determines using time-domain based analysis whether these changes are taking place over a time period to suggest natural changes in the face 1730, artificial changes in face 1730 warranting further analysis, or a mismatch of the history of binary data of the requester 1450 with the face 1730. The gateway 1402 may identify the unique differences and verify that the differences identified in the verification request are consistent with the trending over time. In some implementations, the gateway 1402 may factor in lifestyle and daily routines of the requester 1450 in the Time-Domain Trending Algorithm. For example, if the requester 1450 enjoys outdoor activities, the Algorithm may factor in increased tanning during the summer season. The Proactive Collision Identification Algorithm combined with the Time-Domain Trending Algorithm allows the method of this embodiment of the invention to maintain its high performance in a large population '1:N' solution.

In some implementations, the Time-Domain Trending Algorithm may reduce the change over time in the biometric data into one or more equations that characterize the change over time (e.g., curve fitting algorithms). The linearity of the one or more equations over time may determine the integrity of the changes. If a particular area of the change is represented as a discrete function, the change may be flagged as a potential threat (e.g., disguise, incorrect match). The changes may also be evaluated based on the physical location of the pixel box on the face. Locations may be weighted based on the probability of change in that area of the face. Significant changes in low probability change areas will be flagged as a potential threat.

Figure 28:
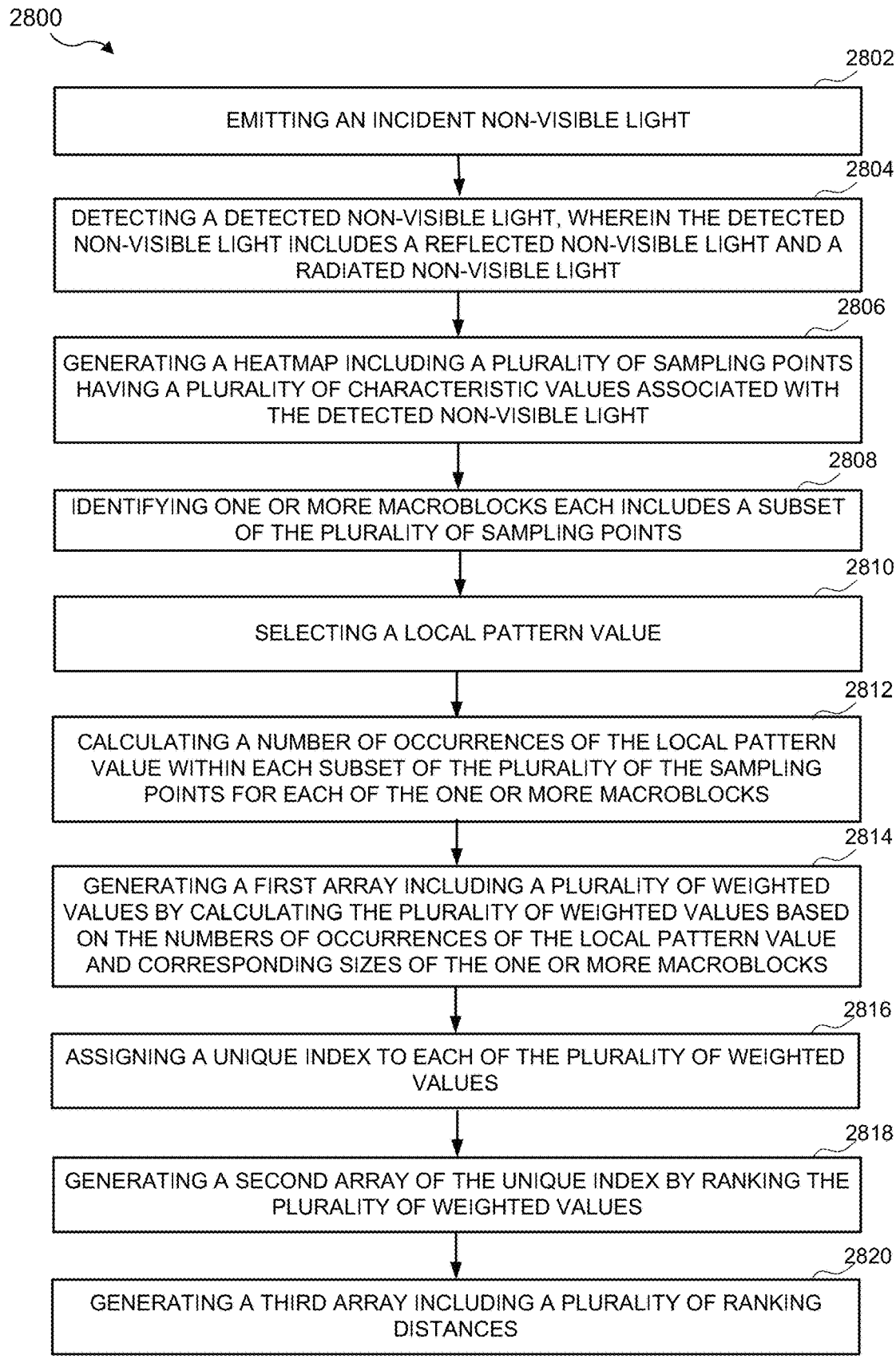
FIG. 28 illustrates a flow chart of a method for identifying biometric templates.

Turning now to FIG. 28, referencing figures above, in some implementations, a method 2800 of constructing a biometric template may be performed by the ECD 1404.

In optional implementations, the method 2800 may perform an enrollment process. The enrollment process may include the ECD 1404 capturing a plurality of images (e.g., 5, 10, 15, 20, 30, 50) of the face 1730. The ECD 1404 may convert the plurality of images to biometric data as described above.

At block 2802, emitting an incident non-visible light. For example, the illumination source 1704 may emit an incident non-visible light. The non-visible light may include near IR or UV. In some implementations, the illumination source 1704 may emit a visible light.

At block 2804, detecting a detected non-visible light, wherein the detected non-visible light includes a reflected non-visible light and a radiated non-visible light. For example, the optical sensor 1702 may detect a detected non-visible light, wherein the detected non-visible light includes a reflected non-visible light and a radiated non-visible light. In some implementations, the optical sensor 1702 may detect IR light reflected off of the face 1730 of the requester 1450 and/or IR light radiated due to the heat of the requester 1450.

At block 2806, generating a sampled profile including a plurality of sampling points having a plurality of characteristic values associated with the detected non-visible light. For example, the algorithm module 1856 may generate a sampled profile, such as the sampled profile 2000, including a plurality of sampling points having a plurality of characteristic values associated with the detected non-visible light.

At block 2808, identifying one or more macroblocks each includes a subset of the plurality of sampling points. For example, the algorithm module 1856 may identify one or more macroblocks each includes a subset of the plurality of sampling points. The one or more macroblocks may be a 10×10 macroblock, a 15×15 macroblock, a 20×20 macroblock, a 30×30 macroblock, a 35×35 macroblock, and a 40×40 macroblock. Other sizes are possible. In some implementations, the ECD 1404 may identify 2165 macroblocks having 2165 associated dimensions.

At block 2810, selecting a local pattern value. For example, the algorithm module 1856 may select a local binary pattern value of 20. In other examples, the algorithm module 1856 may select a local ternary pattern value.

At block 2812, calculating a number of occurrences of the local pattern value within each subset of the plurality of the sampling points for each of the one or more macroblocks. For example, the algorithm module 1856 may calculate a number of occurrences of the local pattern value within each subset of the plurality of the sampling points for each of the one or more macroblocks.

At block 2814, generating a first array including a plurality of weighted values by calculating the plurality of weighted values based on the numbers of occurrences of the local pattern value and corresponding sizes of the one or more macroblocks. For example, the algorithm module 1856 may generate a first array including the weighted values shown in the table 2300 (i.e., [0.30 0.54 0.15 0.42 0.62 0.46 0.53]).

At block 2816, assigning a unique index to each of the plurality of weighted values. For example, the algorithm module 1856 may assign unique indices (i.e., 1, 2, 3, 4, 5, 6, and 7) to each of the plurality of weighted values shown in the table 2300. The unique index 1 is assigned to the weighted value of 0.30, 2 to 0.54, 3 to 0.15 . . . , etc.

At block 2818, generating a second array of the unique index by ranking the plurality of weighted values. For example, the algorithm module 1856 may generate a second array of the unique index by ranking the plurality of weighted values, such as the sequence 5, 2, 7, 6, 4, 1, 3 in the table 2300. In some implementations, the second array/sequence may indicate a ranking of the weighted values from the highest to the lowest. The first number in the sequence is 5 because the weighted value (i.e., 0.62) associated with the unique index of 5 is the highest among the elements of the first array.

At block 2820, generating a third array including a plurality of ranking distances. For example, the algorithm module 1856 may generate a third array including a plurality of ranking distances, such as the stored array [5 1 6 4 0 3 2] in the table 2300. A ranking distance may indicate a numerical difference between the ranks of the highest weighted value (e.g., 0.62—rank 1) and the current weighted value (e.g., 0.30—rank 6). Therefore, the ranking distance between 0.62 and 0.30 may be 5 (i.e., 6−1).

In some optional implementations, during the verification process, the biometric data based on the sampled profile (the "requestor biometric data") may be compared to the biometric data of the plurality of images captured during the enrollment process (the "enrollment biometric data"). If the matching percentage exceeds a threshold percentage (e.g., 20, 30, 40, 50, 60, 70, or 80), the ECD 1404 and/or one of the gateways 1402 may determine that the requestor biometric data is a positive match and the verification is successful.

In certain aspects, the ECD 1404 and/or one of the gateways 1402 may adjust the enrollment biometric data over time to accommodate any changes to the face 1703 due to, for example, sun tan, aging, injuries, mood change, weight change, facial hair change, cosmetics usage, accessories, or other causes. During each verification, the ECD 1404 and/or one of the gateways 1402 may adjust a portion (e.g., 20%, 30%, 40%, 50%) of the enrollment biometric data. Another portion of the biometric data may remain unchanged.

It will be appreciated that various implementations of the above-disclosed and other features and functions, or alternatives or varieties thereof, may be desirably combined into many other different systems or applications by one ordinarily skilled in the art. Also that various presently unforeseen or unanticipated alternatives, modifications, variations, or improvements therein may be subsequently made by those skilled in the art which are also intended to be encompassed by the following claims.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

What we claim is:

1. An edge capture device (ECD), comprising:
   an illumination source configured to emit an incident non-visible light toward a requester;
   an optical sensor configured to detect a detected non-visible light;
   a processing circuit operatively coupled with the illumination source and the optical sensor, the processing circuit is configured to:
      generate a sampled profile including a plurality of sampling points having a plurality of intensities of the detected non-visible light;
      identify one or more macroblocks, wherein each macroblock includes a coordinate and a subset of the plurality of sampling points,
      calculate a number of occurrences of a local pattern value within each subset of the plurality of the sampling points for each of the one or more macroblocks;
      generate a first array including a plurality of weighted values, wherein each of the plurality of weighted values is calculated by dividing the corresponding number of occurrences of the local pattern value by a size of a corresponding macroblock of the one or more macroblocks;
      assign a unique index to each of the plurality of weighted values;
      generate a second array of the unique indices by ranking the unique indices based on an associated weighted value;
      generate a third array including a plurality of ranking distances between a highest weighted value of the plurality of weighted values and each weighted value of the plurality of weighted values; and
      construct a biometric template of the requester based on the third array and the coordinates.

2. The ECD of claim 1, further comprises a scanner configured to:
   send an interrogatory signal to a proximity card of the requester; and
   receive a response signal including an identification sequence associated with the proximity card.

3. The ECD of claim 1, further comprises a keypad configured to receive a password input by the requester; wherein the processing circuit is configured to determine whether the password input by the requester matches any one of a plurality of authorized passwords.

4. The ECD of claim 1, further comprises a microphone configured to receive a voice input by the requester, wherein the processing circuit determines whether the voice input matches any one of a plurality of authorized voices.

5. The ECD of claim 1, wherein the illumination source is further configured to emit at least one of an ultraviolet light or an infrared light.

6. The ECD of claim 1, further comprises a modem configured to transmit the biometric template to a remote gateway.

7. The ECD of claim 1, wherein the processing circuit further comprises:
   a bus;
   a plurality of processing boards each having a processor and a memory; and
   a controller configured to distribute copies of the biometric template to the plurality of processing boards, wherein the plurality of processing boards simultaneously compare the copies of the biometric template with authorized biometric templates stored in the memory.

8. The ECD of claim 1, wherein the optical sensor includes a wide lens.

9. The ECD of claim 1, wherein the optical sensor is further configured to detect at least an eye of the requester.

10. The ECD of claim 1, wherein the optical sensor is further configured to detect at least one of a reflected infra-red light, a reflected ultra-violet light, or a radiated infra-red light from the requester.

11. The ECD of claim 1, further comprises a display configured to display an image of a face of the requester in a visible light, wherein the image is captured by the optical sensor.

12. The ECD of claim 11, wherein the display is further configured to show alignment marks for aligning the face of the requester to the optical sensor.

13. An infrastructure, comprising:
   an access-controlled asset; and
   an edge capture device (ECD) ECD associated with the access-controlled asset, the ECD includes:
      an illumination source configured to emit an incident non-visible light toward a requester;
      an optical sensor configured to detect a detected non-visible light; and
      a processing circuit operatively coupled to the illumination source and the optical sensor, the processing circuit is configured to:

generate a sampled profile including a plurality of sampling points having a plurality of intensities of the detected non-visible light, identify one or more macroblocks, wherein each macroblock includes a coordinate and a subset of the plurality of sampling points, calculate a number of occurrences of a local pattern value within each subset of the plurality of the sampling points for each of the one or more macroblocks;

generate a first array including a plurality of weighted values, wherein each of the plurality of weighted values is calculated by dividing the corresponding number of occurrences of the local pattern value by a size of a corresponding macroblock of the one or more macroblocks;

assign a unique index to each of the plurality of weighted values;

generate a second array of the unique indices by ranking the unique indices based on an associated weighted value;

generate a third array including a plurality of ranking distances between a highest weighted value of the plurality of weighted values and each weighted value of the plurality of weighted values; and construct a biometric template of the requester based on the third array and the coordinates.

14. The infrastructure of claim 13, wherein the access-controlled asset includes at least one of a vault, a lock, a secure door, a secure gate, an equipment, a machinery, a computing device, a digital storage device, a database, and a file.

15. The infrastructure of claim 13, further comprises a gateway configured to:

receive a positive match indication from the ECD; and transmit a positive match signal, in response to the positive match indication, to the access-controlled asset associated with the ECD to allow the requester access to the access-controlled asset.

16. The infrastructure of claim 13, wherein the ECD further comprises a scanner configured to:

send an interrogatory signal to a proximity card of the requester; and receive a response signal including an identification sequence associated with the proximity card.

17. The infrastructure of claim 13, wherein the illumination source is further configured to emit at least one of an ultraviolet light or an infrared light.

18. The infrastructure of claim 13, wherein the processing circuit further comprises:

a bus;

a plurality of processing boards each having a processor and a memory; and a controller configured to distribute copies of the biometric template to the plurality of processing boards, wherein the plurality of processing boards simultaneously compare the copies of the biometric template with authorized biometric templates stored in the memory.

19. The infrastructure of claim 13, wherein the optical sensor includes a wide lens.

20. An system, comprising:

a plurality of edge capture devices (ECDs) including a first ECD and remaining ECDs, the first ECD includes:

an illumination source configured to emit an incident non-visible light toward a requester;

an optical sensor configured to detect a detected non-visible light;

a memory storing a plurality of authorized biometric templates; and a processing circuit operatively coupled to the illumination source and the optical sensor, the processing circuit is configured to:

generate a sampled profile including a plurality of sampling points having a plurality of intensities of the detected non-visible light, identify one or more macroblocks, wherein each macroblock includes a coordinate and a subset of the plurality of sampling points, calculate a number of occurrences of a local pattern value within each subset of the plurality of the sampling points for each of the one or more macroblocks;

generate a first array including a plurality of weighted values, wherein each of the plurality of weighted values is calculated by dividing the corresponding number of occurrences of the local pattern value by a size of a corresponding macroblock of the one or more macroblocks;

assign a unique index to each of the plurality of weighted values;

generate a second array of the unique indices by ranking the unique indices based on an associated weighted value;

generate a third array including a plurality of ranking distances between a highest weighted value of the plurality of weighted values and each weighted value of the plurality of weighted values;

construct a biometric template of the requester based on the third array and the coordinates; and transmit, via a modem, to the gateway the constructed biometric template in response to a failure to find a local match for the constructed biometric template; and a plurality of access-controlled entry points each associated with a ECD of the plurality of ECDs;

a gateway communicatively coupled to the plurality of access-controlled entry points and the plurality of ECDs, the gateway is configured to:

receive the constructed biometric template of the requester from the first ECD of the plurality of ECDs;

compare the constructed biometric template to a plurality of biometric templates;

identify a positive match between the constructed biometric and one of the plurality of biometric templates;

and transmit a positive match signal, in response to the positive match, to the first ECD to allow the requester access to an access-controlled entry point associated with the first ECD.

* * * * *